United States Patent [19]

Liebermann

[11] Patent Number: 5,701,804
[45] Date of Patent: Dec. 30, 1997

[54] LOW TEMPERATURE CLAMSHELL COOKING AND STAGING GRILL APPARATUS AND PATHOGENIC RISK MANAGEMENT PROCESS

[76] Inventor: Benno E. Liebermann, 2805 Lime Kiln La., Louisville, Ky. 40222

[21] Appl. No.: 697,369

[22] Filed: Aug. 23, 1996

Related U.S. Application Data

[63] Continuation-in-part of Ser. No. 519,831, Aug. 25, 1995, Pat. No. 5,570,625.

[51] Int. Cl.$^6$ .............................................. A47J 37/00
[52] U.S. Cl. .................................... 99/330; 99/349
[58] Field of Search .......................... 99/330–332, 340, 99/349, 353, 372, 374–380; 426/523; 100/93 P, 257; 219/524, 525; 126/374, 378, 389, 390, 376; 165/104.21, 104.26

[56] References Cited

U.S. PATENT DOCUMENTS

| | | | |
|---|---|---|---|
| 4,047,476 | 9/1977 | Liebermann | 99/325 |
| 4,102,256 | 7/1978 | John et al. | 99/372 |
| 4,224,862 | 9/1980 | Liebermann | 99/349 |
| 4,241,650 | 12/1980 | John et al. | 219/525 |
| 4,586,428 | 5/1986 | Adamson | 99/332 |
| 4,601,237 | 7/1986 | Harter et al. | 99/349 |
| 4,700,619 | 10/1987 | Scanlon | 99/422 |
| 4,878,424 | 11/1989 | Adamson | 99/331 |
| 5,129,313 | 7/1992 | Coppier | 219/524 |
| 5,178,059 | 1/1993 | Eschlboeck et al. | 99/349 |
| 5,247,874 | 9/1993 | George, II et al. | 100/93 P |
| 5,341,727 | 8/1994 | Dickson | 99/335 |
| 5,363,748 | 11/1994 | Boehm et al. | 99/372 |

Primary Examiner—Timothy F. Simone
Attorney, Agent, or Firm—Middleton & Reutlinger; David W. Carrithers

[57] ABSTRACT

An apparatus and low temperature process providing a means for ensuring bacteriological safety in the fast food production of hamburgers and other protein or farinaceous food articles. The present invention is directed toward a method and apparatus for transferring heat to food articles contained in sealed plastic food cooking and staging containers, and is particularly adapted for cooking and/or holding previously cooked food articles quite near to a selected precise internal temperature for prolonged time periods and can be employed to defrost and cook food articles or to complete the cooking of food articles that have been previously cooked and to stage same for prolonged time periods at optimum product quality and at a precise internal product temperature within the narrow equilibration range of from between ±2° F. and ±5° F. thereby assuring precision, time and temperature-related, means for pathogenic risk management and food safety for public consumption.

20 Claims, 23 Drawing Sheets

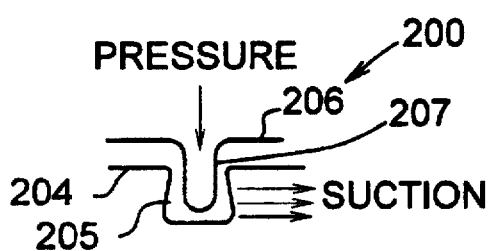
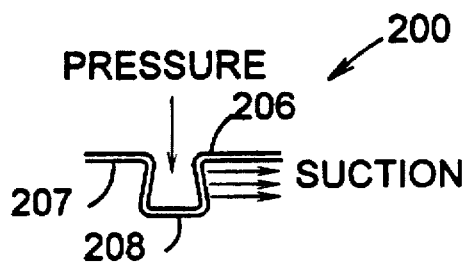
FIG. 30  FIG. 31
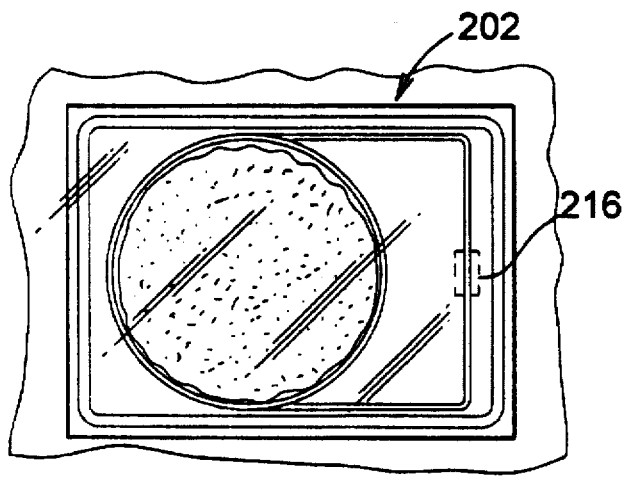
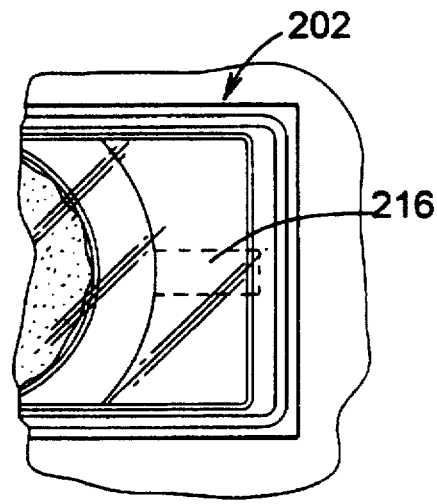
FIG. 32  FIG. 34
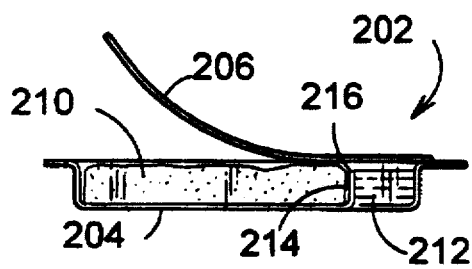
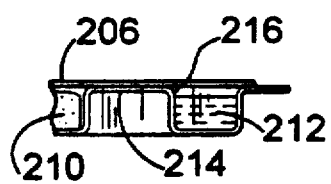
FIG. 33  FIG. 35

LOW TEMPERATURE CLAMSHELL COOKING AND STAGING GRILL APPARATUS AND PATHOGENIC RISK MANAGEMENT PROCESS

This application is a Continuation-In-Part of Ser. No. 08/519,831 filed on Aug. 25, 1995 now U.S. Pat. No. 5,570,625.

BACKGROUND OF THE INVENTION

The present invention relates to a process and an apparatus for transferring heat to food articles for low temperature cooking and staging and, more particularly, means for cooking food articles in frozen or fresh state or for holding previously cooked food articles, equilibrated at a selected, pathogenically safe internal temperature for prolonged time periods. Moreover, the present invention can be employed to initially cook food articles or to complete the cooking cycle for food articles that have previously been partially cooked, or are fresh-frozen and packaged for cooking in a heat conducting container such as a plastic pouch, hermetically sealed and relatively free of oxygen for extension of the food article's shelf life in preserved or frozen format for periods of up to one year or for preventing oxidation of the product due to exposure to the air.

The clamshell cooking and staging grill of the present invention utilizes conduction and radiation heat transfer dynamics relevant to low-temperature cooking and staging of non-cured meats, and/or other food substrates such as grains and vegetables, but particularly ground meats such as hamburger beef, turkey, chicken, or fish patties. *Escherichia coli* and other pathogenic risks are reflected herein as a food safety risk management process and the apparatus to consistently and repetitiously achieve it at selected time and temperature conditions while maintaining the optimal flavor characteristics of the food article for prolonged time periods.

With regard to retail mass feeding of commercial-level, grilled hamburger products, the bacteriological and pathogenic food safety, color, moisture content, and texture uniformity of the product is of primary concern to the ultimate consumer. The physical characteristics reflect the reference point of quality standards associated with this commodity meat product. Meat products such as hamburger products are traditionally cooked by high-heat, high-speed grilling processes subject to considerable moisture weight losses during any cooking-grilling processes, and require stringent bacteriological safety monitoring.

It must be understood that the energy of heat (i.e., Btu's) can be transferred to any respective product by many different means, yet the key issue is always directly related to the optimum "efficiency factor" associated with any heat transfer processing technique, in this case from a heat source to a food article. The mass production of grilled hamburger products in the fast food service industry is presently accomplished via several conventionally practiced methods, such as the open grill or flame grill, both high-temperature grills utilized extensively worldwide each of which is either electrically or gas-fired.

Conventionally practiced grilling procedures rely on the heat transfer by conduction from a heated grill surface to the respective food article. From a technically descriptive, factual point of view, any plate surface that can be heated by whatever means (e.g., electrical, gas or circulated liquid heat transfer media) is considered to be rightfully designated as a "grill," irrespective of any specific operational surface temperature achievable by various temperature control means. In simple terms, any plate that can be heated to and controlled at an operationally safe temperature can legally be designated as a grill surface plate. Even a cold plate is considered a grill, if the plate is equipped with heating means to achieve a rise in grill surface temperature capable of achieving thereby a desired temperature transfer via a specific process objective to a food article, based on a specific time-temperature heat transfer curve.

The desired internal product temperature achievement, from either frozen or refrigerated food product state, depends therefore on the time span of the food article's exposure to the time span required to achieve a desired internal product temperature in a narrow selected temperature range. Thermal lethality (i.e., destruction) of pathogenic bacteria such as *Escherichia coli* to a safety factor of as much as 99.9% under selected time and low temperature conditions requires a precise time-temperature relationship, which must be consistently achieved with absolute perfection millions of times per day. The cross-sectional color profile of an uncured, cooked meat product, however, is, a function of temperature alone—time is an irrelevant factor. The cross-sectional "color" of a cooked meat patty (i.e., a grilled hamburger), therefore, is a function of the ultimate internal product temperature reached and maintained for the staging (i.e., holding) period. We demonstrate that the hemoglobin present in red meat is sensitive to color development only with respect to precise internal product temperature, and is therefore not dependent upon any certain of length of time during which the hamburger patty is exposed to precisely controlled (to within the narrow range of from ±2° to 5° F., at temperature variances of from about 130° to about 185° F., and preferably from about 150° to about 165° F.), internal or external product temperatures commonly practiced in conventional cooking, grilling and staging processes.

It is therefore physically impossible to evaluate a cooked food product by its color and ensure that conventionally cooked (i.e., grilled) fast food hamburgers achieve exact, pathogenically safe, optimum internal temperatures within specific time spans due to uncontrollable hot and cold spots which are inherent shortcomings of conventional grills. Restaurants currently cook (i.e., grill) hamburgers, and then usually store (i.e., "hold" or "stage") them temporarily in various, high moisture-generating heating units developed by the industry for that function. The quality of products staged in such equipment deteriorates rapidly, due to degradation of the product in terms of moisture loss, declining flavor intensity, cosmetic appearance and "mouth feel," and, most importantly, uncontrollable pathogenic risk management affecting the food product's safety for consumption and resulting in an organoleptically stewed" meat profile.

The lower an end internal product temperature factor is achieved, the lighter the pink color will be maintained in the ground meat product's cross-section. Conversely, the higher the internal temperature of the product is elevated, the darker the meat patty's color will develop until, in due time, the product's cross-section turns grayish brown in color at the point of full doneness (in the range of 155° to 165° F.).

Since scientifically verified regulations were published by the USDA and FDA in the Federal Register in 1993, specifying mandatory guidelines and establishing a standard, precise time-temperature relationship for guaranteed thermal lethality of pathogenic organisms in uncured ground meat patties for the industry to implement and practice, it became evident that in practice, under "real world" conditions, these objectives and regulations cannot be consistently achieved via conventional grilling equipment and procedures as currently practiced in the industry worldwide.

Until quite recently (prior to 1991) thermal lethality (i.e., "thermal kill") directives for dangerous pathogens in food articles, published by the U.S. Department of Agriculture [hereinafter "USDA"], required that a ground beef patty be thermalized (i.e., cooked) on a grill to an internal temperature of at least 155° F., and then maintained at a 155° F. internal temperature for staging (i.e., "holding hot" storage). Due to the subsequent discovery of increased heat resistance of lethal pathogens in food products, as revealed during ongoing, extensive research by the federal authorities to clearly identify public health hazards, in 1993 the USDA and the U.S. Food and Drug Administration [hereinafter "FDA"] dramatically increased their directives' internal food cooking temperature mandates in order to assure public food safety in accordance with the time and temperature-related cooking requirements represented by Table I and Table II, and mandated into compliance law as published in the Federal Register.

Table I shows the Time-Temperature Cooking Requirements As Mandated by the USDA prior to 1991. The data for Table I is shown for the time/temperature combination for cooked ground beef, cooked beef, roast beef, and cooked corned beef as follows:

TABLE I

| Minimum internal temperature (Degrees Fahrenheit) | Minimum processing time in minutes after minimum temperature is reached |
| --- | --- |
| 130 | 121 |
| 131 | 97 |
| 132 | 77 |
| 133 | 62 |
| 134 | 47 |
| 135 | 37 |
| 136 | 32 |
| 137 | 24 |
| 138 | 19 |
| 139 | 15 |
| 140 | 12 |
| 141 | 10 |
| 142 | 8 |
| 143 | 6 |
| 144 | 5 |
| 145 | Instantly |

Table II shows the Time-Temperature Cooking Requirements As published by the USDA in 1993. The data for Table II is also shown for the time/temperature combination for cooked beef, roast beef, and cooked ground beef as follows:

TABLE II

| Minimum internal temperature (Degrees Fahrenheit) | Minimum processing time after minimum temperature is reached (Seconds) |
| --- | --- |
| 151 | 41 |
| 152 | 32 |
| 153 | 26 |
| 154 | 20 |
| 155 | 16 |
| 156 | 13 |
| 157 | 10 |
| 158 | 7 |
| 159 | 4 |
| 160 | 1 |

Based on these recently recognized facts the issue of precise and repetitiously consistent, internal product temperature control, in relation to product staging (i.e., holding) time, becomes the single most critical factor in the attempt to guarantee both bacteriological (i.e., pathogenic) product safety, as well as a consistently high level of end product first quality attributes, which are dependent on the maximum retention of moisture in the meat patty, by which organoleptic product quality attributes are subconsciously measured for reference by the consuming public.

Thus, regardless of the specific cooking (i.e., grilling) technology deployed in processing hamburger products, via either conduction heat, convection heat or steam heat, also known as "wet cooking," the precise and consistent internal product temperature control factor, to be attained and maintained according to USDA regulations in each beef patty unit irrespective of minute, individual weight variances existing in the total batch, is the single most critical quality control factor affecting the food safety, optimum yield (i.e., moisture retention) and uniform doneness specifications of the end product, replicable millions of times per day absent any reliance on human judgment and without the danger of potential human error jeopardizing food safety.

Clamshell grills in current use by the industry supply a range of surface temperatures approximating 350° F. on the lower grill surface, and about 425° F. on the upper surface. When a frozen hamburger patty is compressed between the two heated surfaces under these high temperature conditions, the patty is in fact converted into a flat "pressure vessel", in that the temperature of the patty's moisture content is so rapidly elevated during the grilling cycle (approximately 95 seconds) that the resulting moisture vapor pressure inside the patty or, "vessel", forces the heated steam moisture to seek a path of horizontal escape. Due to this thermodynamic reaction within the confinement of the clamshell grill's two heated surfaces, wherein the patty's inherent moisture content (about 70 to 75% of its total weight) is converted first into water vapor and then, at about 211° F., into steam, the pressurized moisture is evacuated from the patty along the path of least resistance into the surrounding atmosphere.

Given that the patty is "closed" on its top and bottom planes while it is situated on a clamshell grill (i.e., these potential escape routes are effectively blocked by the grill plate surfaces), the steam generated within the patty is forced to seek escape along a horizontal plane, in an outward direction from the patty's center. In other words, the patty's moisture must exit through the 360° circumference of its own outer periphery. Under these conditions, the escaping steam is forced to travel a much lengthier path than vapor evacuation would naturally take were it not restricted by interference of the upper clamshell grill surface. Absent contact between the patty and the upper grill surface, escaping steam would find the path of least resistance by exiting across the patty's top plane. Depending on which formula applies for determining the paths of vapor evacuation routes under "bottom grilling" procedures vis-avis "top and bottom grilling" methods, the paths calculated under present clamshell grilling techniques are from 8 to 12 times longer than experienced with grilling from a bottom surface alone, depending on the variables associated with a patty's thickness in relation to its weight.

Any hamburger patty's extremely delicate myosin, protein, fat, and "juice" flavor components are drastically altered as a result of this circuitous vapor evacuation route under current grilling conditions. In effect, a "stewing" process of the meat is occurring. Extensive oxidation and "vapor washing" are evacuating the rich aromatic and flavor components essential to the perception of a desirable end product. Consequently, we technically sabotage the very elements we are attempting to safeguard and preserve in the ultimate product. Since the industry is dedicated to improving customer service through the implementation of product "staging" systems, it behooves us to prepare meat patty products in such a manner as to maximize moisture retention, flavor, and aromatic intensity during the thermalization process. This permits the greatest possible preservation of the product's delicate moisture, aromatic and flavor attributes for prolonged staging periods. The higher a grilled product's quality level is upon entrance into the staging system, the higher it will be upon presentation to the ultimate consumer and to exert maximum control over any variable that diminishes the greatest potential perception of quality and desirability by the consuming public, and at the same time to maximize the product's pathogenic safety.

The currently practiced high-temperature, high-speed clamshell grilling equipment's configuration results in conduction heat transfer to the patty from the lower grill surface, and permits radiation and conduction heat transfer from the top clamshell, thereby converting the meat patty into a pressure vessel. Vapor generated within the patty is therefore able to escape as steam only across the patty's entire upper horizontal plane, where it finds an unobstructed escape route to the surrounding atmosphere. These steam vapors are forced through the patty's mass, thus, oxidizing the meat and "laundering" the patty of its most desirable flavor components, instead of permitting the greatest possible preservation of nutritional, aromatic and taste-enhancing properties within the patty. The new and novel, low-temperature, plastic pouch contained patty grilling process described heretofore preserves maximum moisture, nutrients and meat aromas.

Cooked, ready-to-eat foods have long existed on the technology lists of many countries, but cooking at significantly lower temperatures is a completely new technological approach supporting the basic concept that such foods can form a new class of cooked foods with special dietetic characteristics. It is widely recognized that a controversial, proportional dependence exists between the degree of protein denaturation during cooking and the degree of assimilation of such proteins by the human digestive system. As higher cooking temperatures are used for foods, a lower assimilation of their proteins results.

The use of high cooking temperatures, with their inherent variabilities, springs from the desire to ensure full killing of foodborne pathogenic bacteria, so as to improve the safety of cooked foods. At the present time, cost ready-to-eat foods accomplish this goal; unfortunately, though, many such foods do not always fulfill the requirements of nutritionists, dietitians and toxicologists. Humans of different age groups need foods with differing nutritional and dietetic characteristics. Often, children, the elderly and the sick need especially juicy, easily assimilated, nutritious, safe and appetizing cooked foods. Such needs are of paramount concern to nutritionists and physicians specializing in chronic metabolic diseases as well as diseases of the digestive system, liver, kidney and other internal organs.

The food industry is obligated to supply segments of the population—children, elderly people and those afflicted with diseases impairing digestion and/or assimilation of foods characterized by fixed, improved dietetic and nutritional content. In employing the low temperature conduction cooking system to provide the technology for a radially new cooking methodology, and collaborating with human nutritionists, dietitians, food technologists and food safety microbiologists, the creation of a new class of cooked foods can realistically begin. Separate, specialized formulations may be adapted for kindergartens, nursing homes, hospitals and other sites supplying foods to meet specific consumer requirements for food with higher nutritional and biological values, and selected dietetic characteristics.

If grilling temperatures higher than the ultimately desired internal product temperature of 155° to 165° F. are utilized during a cook cycle, then, regardless of the specific grilling heat source, the desired internal product temperature of each individual beef patty will be reached at time and temperature variations directly related to differences in unit weight, mass, and moisture and fat percentages. Consequently patties with relatively lower single-unit weights, when exposed to elevated grill temperatures ranging from 350° up to 425° F., depending on the cooking methodology utilized, will attain higher internal temperatures within the same given time span than will those patties with greater unit weights.

It is emphasized that precise control of individual unit weight factors in mass produced, ground meat patties, to within a variance of less than ±0.01 to 0.0125 grams per single product unit, is economically unfeasible. Any attempt to further narrow this weight tolerance per single ground meat patty unit is not justified, as such would increase the product's end price on the marketplace above a competitive "commodity" level.

Consequently, the only option available to precisely control the internal temperatures of individual ground meat patty product cooked (i.e., grilled), in small or large batches, irrespective of their variable single unit product weight factors, is by exposure of the total volume of products to a conduction heat transfer environment maintained precisely at, and not higher than, the end temperature desired as the ultimate internal product temperature for the entire batch. Under these conditions all single patties, regardless of their variable unit weights, will ultimately equilibrate at an identical internal product temperature, within the narrow range of ±1° F., within a-given time span, thereby meeting all USDA regulations related to time-temperature exposure and consequently guaranteeing bacteriological safety and optimum end product quality attributes.

Thus, the product unit with the least unit weight factor will reach a given internal temperature of, as an example, 150° F., if exposed to a conduction temperature of 150° F. for a time factor of X; where units with greater unit weight factors will ultimately attain the identical internal temperature with a time factor of X+Y, while the smaller product unit is simultaneously maintained (i.e., held) at the ultimate temperature during the time span required for larger product units to reach optimum internal temperature as specified in the USDA's mandatory regulations.

No single grilled product unit, however, regardless of its variable individual weight factor, will ever attain a higher equilibrated internal temperature than the conduction temperature to which the full batch is exposed, in the above example 150° F. Bearing in mind the objective of such precise internal temperature control over products varying in their respective unit weights, the time span utilized to equilibrate and hold is therefore dependent on the specific grill surface conduction temperature exposure, and demonstrates the consistent achievement of control over the most critical point of reference of the process and apparatus.

Conventional methods for temporary storage or staging of hamburger patties in high-humidity environments for prolonged time spans does affect the product's optimum yield (i.e., moisture content), tenderness and myosin bond structure, thereby influencing the patties' organoleptic attributes as well as their perceived "bite-feel."

The low temperature clamshell, low-temperature conduction and radiation, cooking and staging grill of the present invention may be used as a means of thawing precooked, frozen meat patties, cooking fresh-frozen meat patties and eliminating the pre-cooking step, or staging for equilibration purposes, with the advantage of fully grilled patties consistently achieving equilibrated internal product temperatures varying between 155° and 165° F., within the narrow, selectable temperature range of from about ±2° to about ±5° F. The food article such as a meat product processed thereby retains a significantly higher moisture content than during the high-speed elevation of internal product temperature by conduction through exposure to surface grill temperatures ranging from 350° to 425° F. The cooking and staging grill is designed for maintaining internal product temperature equilibration to a final, pathogenically safe temperature, requiring only that the sum total of all products exposed to the equilibration process in the staging grill to achieve a temperature equilibration balance between 1° and 15° F. A maximum temperature elevation of only 10° to 15° F. is needed to raise all individual food articles to the ideal internal temperature when these products have been either fully cooked on an open grill or a clamshell grill at high speeds, for between 90 and 240 seconds, as practiced universally by the industry with high-speed, high-temperature grills.

Based on the above-described critical factors associated with the mass production of grilled ground beef (i.e., hamburger) products, the optimum risk management via the low-temperature clamshell cooking and staging grill technology offers the most precise and efficient heat transfer dynamics capable of consistently guaranteeing the bacteriological (i.e., pathogenic food) safety, color uniformity, moisture retention and highest organoleptic quality attributes in the mass production of this food article, all benefiting the perfection of state-of-the-art technical performance achievements for providing first quality food which is impossible to attain with conventionally known and practiced grilling technologies.

Ground red meats which are neither injected nor marinated with curing agents of any type, such as nitrites, nitrates, salts, phosphates or other formulated curing agents, may be subjected to various internal product temperature elevation procedures resulting in desired doneness levels (i.e., cross-sectional color intensity, from bloody pink to grayish brown), ranging from 130° to 165° F. in temperature exposure. The meats are then held at a selected, precise temperature for various staging time spans in accordance with stringent USDA regulations depending strictly on exposure to their specific temperature factors for desired, uniform cross-sectional color profile development. Contrary to conventional grilling processes, the actual staging (i.e., holding) time factor, at an equilibrating temperature from 150° to 165° F., is therefore irrelevant in determining the cross-sectional meat color profile.

The low-temperature conduction and radiation, high-speed cooking and staging grill comprises at least one top cover plate having at least a bottom heating surface and at least one bottom plate having a top heating surface. The preferred embodiment of the cooking and staging grill comprises at least one top cover plate having a bottom heating surface, at least one bottom plate having a top non-heating surface, and at least one intermediate plate having top and bottom heating surfaces. The at least one intermediate plate usually includes a plurality of horizontally layered and interlocking plates having top and bottom heating surfaces disposed between the top cover and bottom plate forming a deck in a clamshell arrangement wherein the top cover plate and intermediate plates are joined together by floating hinges. Each plate comprises a first and second sheet of thin heat transfer material joined together such as by roll bonded or pressure welded aluminum. Each plate includes a serpentine fluid heat transfer passage formed thereinbetween for recirculation of a heat transfer media. The recirculated heat transfer media and the surface of the plates are precision-controlled within the narrow range of ±5° F., and preferably within a narrow range of ±2° F. at selected "low" temperatures of less than 212° F. when using a water or water-glycol mixtures due to vapor pressure cavitation exhibited by the pump impeller, or perhaps another 20° F. to 30° F. if pure glycol or other such desirable heat transfer media is used; however, temperatures of 205° F. or less are desirable for safe and efficient operation of the equipment. The plates are designed to effect uniform, low-temperature conduction and radiation heat transfer to the center of each patty or other food article. A computerized, electronic control system directs and monitors the process, and records the time and temperature variables, as well as ultimate internal product temperature equilibration, for the low temperature cooking and staging grill.

The low temperature cooking and staging grill in either double or multi-deck format, will provide equilibrated temperatures for any selected conductive grill surface within the center of each ground beef patty within the precision of from about ±2° to about ±5° F., and even within a precision range of ±1° F. if necessary, irrespective of the position of the patty on the grill plate, or weight, thickness or circumference variables of a wide variety of meet patties. Once a single hamburger (or multitude of patties) is placed in the grill's plates, and clamped between the top cover plate and the bottom plate, and or between intermediate plates positioned thereinbetween, the equilibration temperature selected to effect thermal kill of trace pathogens will be maintained for a minimum time span at a specified selected temperature as mandated by federal regulations sufficient to kill any pathogenic bacteria, before the tray can be opened and the product served. A computerized electronic process monitoring means signals (both audibly and visually) when a plate of hamburgers is available for dispensing and safe consumption, thereby meeting USDA and FDA mandated pathogenic thermal lethality requirements for cooked food articles.

Furthermore, the multi-deck clamshell cooking and staging grill is designed to incorporate interlocking, stacked plates in various shapes and sizes, formed as to depth into a "pan" means, wherein the bottom, deep-drawn "pan tray" is constantly heated by conduction, via the hot, circulating heat transfer fluid, thereby cooking and "holding hot" any food product that is maintained in unit form or in bulk, in an absolutely safe and perfect temperature environment between 160° and 205° F., depending on the specific ideal, or preferred, temperature of any specified food article. The heated, "deep pan tray" is covered with the bottom of a heated plate, positioned above the heated deep pan tray, thereby forming a "lid" means which can be elevated to offer easy removal of a product from the lower deep pan tray for hot food serving purposes at high speeds, and instant lid closure for maximum uniform heat retention of the stored hot food in the bottom pan. Of course, when there is at least one intermediate plate, the top cover may define a non-heated surface which fits over an intermediate plate, whereby food articles such as pastries or rolls may placed on the top surface of the top intermediate plate and a cover plate or tray may be used to assist in covering the food article and retaining the heat.

All vertical, perpendicular and horizontal, fluid-connected vessels will be connectable and disconnectable from the recirculating liquid heat transfer hot media supply via standard, quick-disconnect means, which are available for this application from several manufacturing sources. The same process principle can be practiced in a variety of shapes and apparatus configurations such as double-walled vessels for maintenance of hot soups, coffee, tea, and other foods constituting liquid and solid food substances which may come in prepackaged containers prepared for reheating and serving.

A conventional grills for cooking food articles may be heated with recirculating hot oil to cook raw meat "hamburger" patties or other meat products sandwiched between thin steel heat transfer plates. The raw hamburger meat patties cooked in direct physical contact with and supported on the top surface of a first "lower" steel plate and the raw meat patties and held in place by direct physical contact with the bottom surface of a second "upper" steel plate present quality problems when cooked at the low temperatures necessary for preserving the moisture content and quality of the food articles. Temperature of at least 255° F. are required for searing the meat surface sealing in the juices. Thus, cooking at low temperatures of less than 212° F. presents a problem in that blood and grease oozing from the patties creating a residue buildup which quickly became oxidized and rancid over a short time period creating an unacceptable flavor and organoleptic odor due to the raw and partially cooked meat product and blood adhering to the surface of the steel plate. The quality of the naked ground meat product cooked in the open on the surface of a grill will deteriorate rapidly due to oxidation resulting in degradation of the meat patty in terms of moisture loss, rancid off-flavor intensity, cosmetic appearance and "mouth feel" yielding an organoleptically stewed" meat profile.

The low temperature clamshell cooking and staging grill of the present invention solves these problems by utilizing low heat transfer to cook meat products in heat conducting containers to preserve the moisture content and mouth feel of the food articles.

The method and apparatus described herein for the low temperature conduction and radiation, clamshell cooking and staging grill and processing procedures have a significant impact on the quality of the cooked, hot food product during prolonged staging, due to the fact that any product subjected to this unique staging (i.e., hot holding) procedure will have a dramatic, time-related quality and food safety elasticity by at least 100 to 300 percent longer, due to its higher moisture content retention achieved by the precision equilibration, internal and external food article temperature control and the environment in which the food is stored, by convective, conductive and radiation equilibration within a narrow range of about ±2° to ±5° F., for hours of safe maintenance, without generating any excessive water vapor (i.e., moisture evacuation) from the hot-held food article of protein or farinaceous composition.

The net result is not only addressing the achievement of bacteriological and pathogenic food safety, but highlighting the retention of the delicate, volatile, "seared" flavor components achieved during the preliminary, high-temperature grilling process, and by avoiding the subjection of previously grilled food products to a high-moisture (i.e., saturated) environment in secondary staging which will, by rapid oxidation, negatively quench and dissipate the delicate aromatic and flavor components and preferred attributes achieved with high-temperature grilling, which are organoleptic quality attributes most desired by the consuming public.

SUMMARY OF THE INVENTION

The present invention comprises a low temperature cooking and staging grill and method of use for conduction and radiation heat transfer. The cooking and staging grill provides a means for controlling pathogenic risk management of food articles contained within heat conducting containers such as hermetically sealed plastic pouches. The grill comprises at least one top cover plate having at least a bottom heating surface, and at least one bottom plate having a top heating surface supported by a frame, whereby the top cover plate is pivotally connected to the frame by a floating hinge. Of course, if the top cover plate includes a top heating surface a cover may be used to retain the heat of food articles prepared and/or staged on a top surface of the top cover plate. Preferably the grill is a multi-deck configuration comprising at least one intermediate plate having a top and a bottom heating surface disposed between the top cover plate and bottom plate, wherein the top cover plate and intermediate plates are hingably connected by a floating hinge arrangement to maintain alignment and equal spacing between the plates in the horizontal position. The plates are constructed of thin sheets of heat transfer material, preferably aluminum, formed from welding or rollbonding at least two sheets of material together providing for the circulation of heat transfer fluid hereinbetween. The specially designed heat transfer plate configuration may utilize metal sheets which are seam and spot-welded, and high-pressure, pillow inflation-expanded, with one side flat and with the second side slightly pillow-expanded, which is the preferred method for utilizing rollbonded aluminum sheets providing two substantially flat surfaces with liquid heat transfer media passages. The liquid heat transfer fluid channel is expanded and designed to allow a maximum liquid heat transfer media flow rate, evenly distributed through the entire surface of the plate, achieving by their recirculating liquid transfer channels the maximum uniform and equilibrated heat transfer across the entire plate grill surface within the narrow range of from about ±1 to about ±5° F.

The heat exchange plates are hingeably engagable or disengagable from contact with each other and the thermalized hot-held product by specifically designed spacer configurations aligned for nesting or hingably connecting each of the plates to the housing frame in a manner to maintain an equidistant spacing and alignment between the plates and the housing in the "in-use" position such as by use of a floating hinge. Mechanical hinging means such as removably secured horizontal plates are disengaged in parallel, or the plates are pivotally moveable into vertical position relative to each other by a plurality of lever hinges attached to at least one end of the heat exchange plates and the frame. The floating hinge means enables the fluid-connected heat exchange plates to be perpendicularly opened and maintained in tandem in vertical position, and realigned in precise horizontal condition relative to each other. The hinging arrangement and locking mechanism provides maximum conductive heat transfer to the "clamped" food articles, from the top side as well as from the bottom side of the grill plates, achieving the most efficient heat transfer of Btu's by conduction and partial radiation to the respective food article, namely the hamburger or chicken meat patty or any food article designed to be efficiently thermalized within the space allocation between two or more heat transfer thermalization plates.

The lower side of the grill plate may be provided with round or rectangular protrusions of 3/16" to 1/4" depth providing a stamping means for imprinting into the heat conducting containers and meat patties and securing the patties in vertical cooking or staging position, thus preventing movement of the patties when two engaged grill plates are angularly raised to vertical position for access to a bottom plate containing a volume of cooked and hot-held hamburger patties for immediate sale to respective customers. Further, selected expanded protrusions projecting from the grill plate are may be provided with a desired raised insignia or corporate logo for the purpose of indentation into the heat conducting container enclosing the hamburger patty by the weight of the upper plate for marketing or promotional opportunities.

A low-temperature, liquid heat transfer medium is continuously recirculated via a pump, such as a low-pressure, magnetic centrifugal pump or the like. The lower temperature heat transfer fluid is supplied from a small reservoir equipped with submerged electrical heater means ranging between 1.5 and 5 kwh (or higher, if called for), and controlled by electronic, proportionate thermocouple-sensitive, energy input activating and deactivating means, with milliseconds energy input response. The liquid heat transfer medium can be controlled at a precise temperature selected to effect the grill plate surface temperature within the narrow range of ±1° F.; however, it is generally sufficient to control the temperature in a range of from about ±2° to about ±5° F. The low-temperature cooking and staging grill is designed to operate below the boiling point of 212° F., and therefore does not require any atmospheric, pressure-release venting means. The food article contained within the sealed pouch will achieve complete pasteurization, uniformly, throughout the product by the process at a temperature of less than 212° F.

The low-temperature equilibration cooking grill and staging apparatus does not cause any excessive water vapor pressure in the food product (i.e., hamburger patty), and maintains food articles at a bacteriologically safe temperature without any moisture loss or degradation of the food articles, resulting in perfect quality for prolonged time spans exceeding 30 to 40 minutes.

Conventional grills and fryers, operating at temperatures above 212° F. (i.e., the boiling point of water), and many times extending from 325° F. up into the 425° F. to 500° F. range, are required by law to be equipped with automatic fire extinguishes, and ventilation hoods provided with means for filtration of emitted grease vapor fumes. The low-temperature cooking and staging grill of the present invention generates no objectionable or volatile food odors or grease vapors, and can therefore be operated in any commercial environment without requiring venting and/or fire extinguishing means, such as an ancill system, thus, presenting no objectionable Environmental Protection Agency compliance mandates for public establishments and a cost savings associated with the incorporation, installation, maintenance and operation of exhaust equipment. Furthermore, the elimination of venting and fire extinguishing means is an important consideration in the portability of the stand-alone cooking and staging grill.

Precooked hamburger patties can be efficiently re-thermalized from frozen state and held until sales demand occurs, for prolonged or instant availability. The double-, triple- or quadruple-staggered design of the grill plates can be designed to meet any required production schedule cycle, strictly depending on projected product sales per hour. The low-temperature cooking and staging grill is user-friendly, non-intimidating and perfectly safe for the operator; therefore, no burn hazards or related injuries are associated with operation of the apparatus or practice of the thermalization process.

Electronic safety control means are provided so as to interlock the respective individual plates for a specific, selected operational sequence time. A computerized instrument panel monitors and controls the process of the grill and maintains and digitally displays precise product temperature processing records. Electronic means are mounted on suitable areas of the plate designed to assure the time-temperature maintenance of a volume of hamburger patties for a predetermined time at a specific conduction temperature required to achieve the critical thermal lethality curve for any pathogenic residuals in the patty. The electronic safety control means are so designed as to interlock two respective plates for a specific, predetermined time, and will only release the movement of the plates once sufficient staging time has elapsed, thereby assuring the pathogenic risk management, time-temperature equilibration repetitively guaranteeing the food article's safety, in compliance with USDA-mandated thermalization procedures. Provisions are also incorporated which will sound an alarm should a plate be manually disengaged by an operator prior to the minimum safe time maintenance (i.e., "safety dwell time) for completion of the equilibration cycle as specifically required for product temperature equilibration during prolonged staging.

Thus, the clamshell cook and staging grill of the present invention provides a means for transferring heat to food articles utilizing an apparatus comprising a housing frame having a deck therein of a least a top cover plate having a bottom heating surface and a bottom plate having a top heating surface, and preferably at least one intermediate plate having top and bottom heating surfaces. The plates are spaced apart and in alignment, each plate comprising a first sheet and a second sheet of heat transfer material bonded together having fluid heat transfer passages thereinbetween for recirculation of a heat transfer fluid wherein the plates are mounted to the frame of the housing. The apparatus further includes means for connectively mounting the plates to the housing utilizing a plurality of floating hinges, a reservoir within the housing for containing a heat transfer fluid, means for fluid-connecting the plates and the reservoir, means for heating the heat transfer fluid to a selected temperature in the reservoir, means for controlling the temperature of the heat transfer fluid within the reservoir at ±5° F., means for recirculating the heat transfer fluid through the plates in fluid-connection with the reservoir and each of the heat transfer plates, and temperature sensing means for determining the temperature of each plate or at least one of the food articles contained within the heat conducting container.

The present invention provides a means for pathogenic risk management utilizing a clamshell grill cooking and staging process for transferring heat to food articles sealed within heat conducting containers comprising the steps of placing at least one food article sealed within a heat conducting container between a top cover plate having at least a bottom heating surface and a bottom plate having a top heating surface, or between the top cover plate and at least one intermediate plate of a clamshell cooking and staging grill wherein the top cover plate and the bottom plate and any intermediate plates are spaced apart equal distance and in alignment with one another, and the top cover plate and any intermediate plates are hingeably mounted to a frame of the cooking and staging grill by a floating hinge. The heat transfer fluid contained within a reservoir of said clamshell cooking and staging grill is heated to a selected temperature of less than 212° F. The temperature of the heat transfer fluid is controlled at a selected temperature of ±5° F. The heat transfer fluid is recirculated through the plates in fluid-connection with the reservoir and the temperature of the plate or the food article sealed within a heat conducting container is sensed for controlling the temperature thereof for cooking and/or staging of the food articles sealed in the heat conducting container at a selected temperature for a selected period of time.

It is an object of the present invention to provide an apparatus and process having the ability to thaw, cook and hold a variety of prepared foods at optimum, pathogenically safe temperatures, for extended periods of time, without loss of quality and, most importantly, advancing the most critical aspect of pathogenic food safety for the mass feeding industries.

It is an object of the present invention to provide a system for continuously circulating heated fluid through passage-expanded metal shelves, providing even thermalization temperatures over the respective plate surface within the narrow range of ±5° F., therefore eliminating any hot or cold spots across the entire surface of the grill plate.

It is an object of the present invention to provide a hot-held inventory (i.e., a "bank") of food products to be held for instant serving, in the safest condition and at the highest possible organoleptic quality level.

It is an object of the present invention to provide visual gauges, backed by audible and digitally illuminated, electronic sensing controls for safeguarding the product and monitoring the process.

It is an object to provide actual and set temperature indicators easily viewed on digital electronic displays.

It is an object to provide solid-state microprocessors which maintain tight and consistent temperature monitoring and narrow-range calibration.

It is an object to provide an apparatus designed and constructed to meet stringent safety and sanitation requirements for UL, CSA and NSF approval.

It is an object of the present invention to provide a multi-deck clamshell cook and staging grill that does not require venting, and is implementable in any kiosk or commercial food service operation.

It is an object of the present invention to provide a multi-deck clamshell cook and staging grill which is portable.

It is an object of the present invention to provide a staging process for pathogenic risk management suitable for products thermalized by grilling and/or frying processes, and then held for staging; or for the re-thermalization of precooked, frozen products to be dispensed without further treatment.

It is an object to provide an apparatus and thermalization process to manage the pathogenic risks associated with the deadly pathogen *Escherichia coli* 0157:H7, and achieve thermal lethality thereof.

BRIEF DESCRIPTION OF THE DRAWINGS

A better understanding of the present invention will be had upon reference to the following description in conjunction with the accompanying drawings in which like numerals refer to like parts throughout the several views and wherein:

FIG. 30 is a side view showing two sheets for forming a dove tail tamper proof seam of a plastic cooking pouch;

FIG. 31 is a sectional side view along lines 32—32 of FIG. 32 showing a dove tail tamper proof seam of a plastic cooking pouch;

FIG. 32 is a top plan view showing a two compartment plastic cooking pouch having a passage thereinbetween;

FIG. 33 is a side view of the plastic pouch of FIG. 32 showing the lid peeled back and the food article compartment and fluid compartment formed therein;

FIG. 34 is a partial top view showing a wide wall separating a first food compartment and a second juice containing compartment;

FIG. 35 is a side view of FIG. 34;

SPECIFICATION

Figure 1:
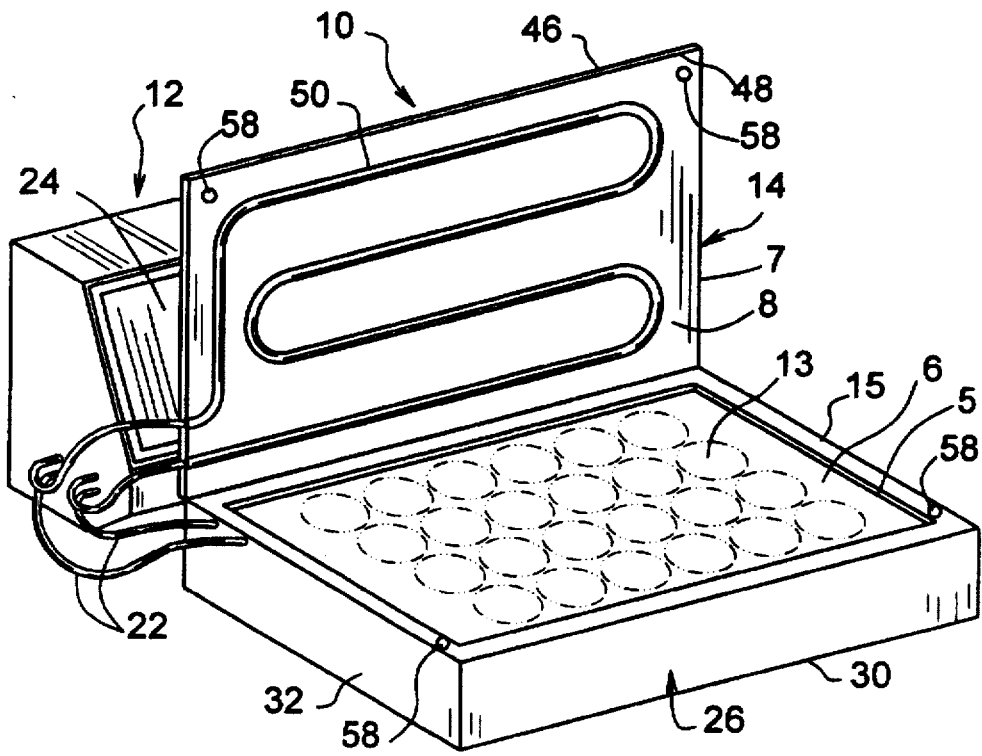
FIG. 1 is a perspective view showing the low temperature cook and staging grill having a top cover plate having a bottom heating surface and a bottom plate within the housing having a top heating surface.
Figure 2:
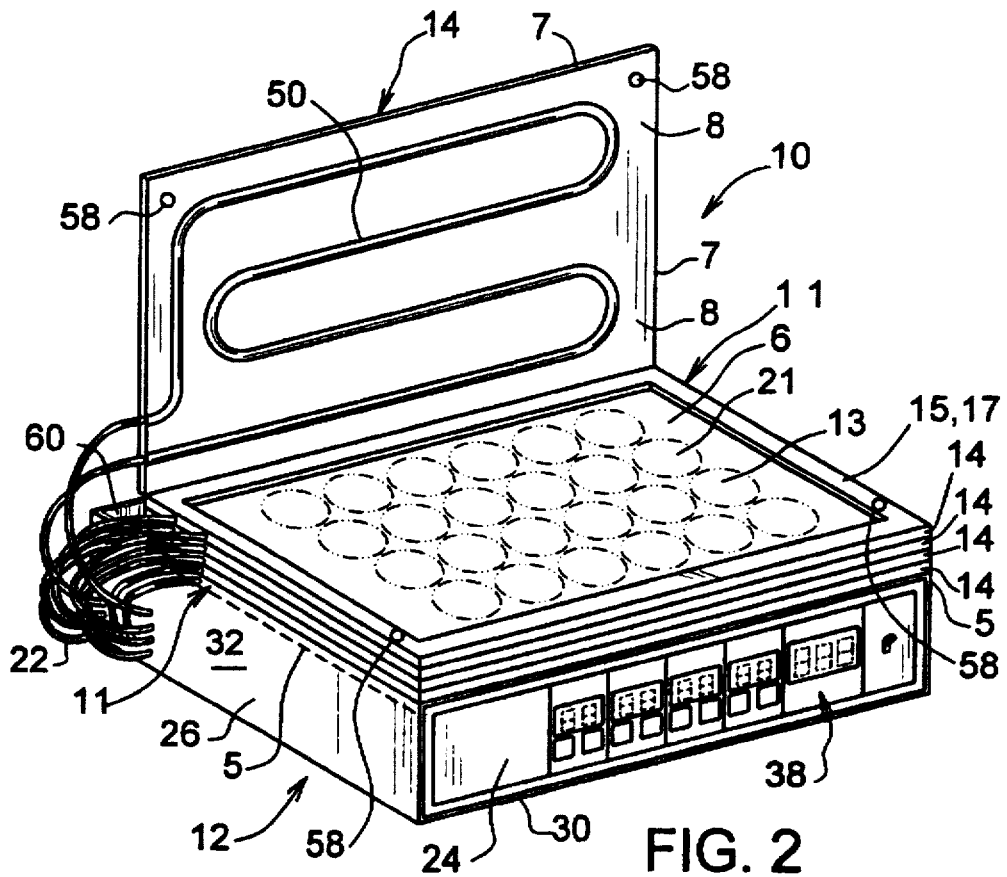
FIG. 2 is a perspective view showing the cook and staging grill of the present invention having one of the stacked interlocking plates being open having a heat transfer conduit shown on the bottom thereof and meat patties being shown in phantom lines on the top of the adjacent plate.
Figure 3:
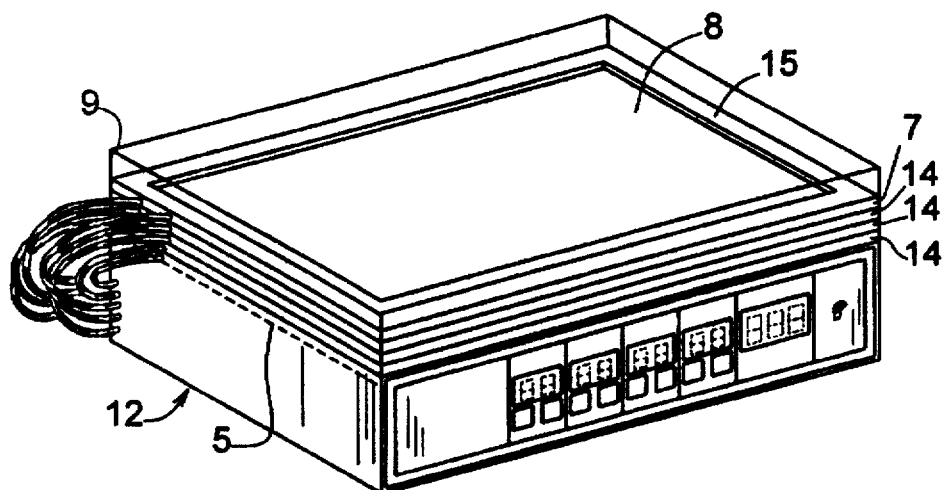
FIG. 3 is a perspective view of the cook and staging grill showing a top cover covering the top cover plate.

As illustrated in the Figures, the present low temperature clamshell cook and staging grill 10 for pathogenic risk management comprises a housing frame 12 a bottom plate 5 having a top heating surface 6 or optionally a flat nonheated surface for supporting food articles 13 thereon which may be incorporated within the housing frame 12, as best shown in FIG. 1. The housing frame 12 supports a deck 11 consisting of at least one top cover plate 7 in held in spaced alignment from the bottom plate 5. The top cover plate 7 includes at least a bottom heating surface 8, but may include a top heating surface 6 as well. The top cover plate 7 is removable from the bottom plate 5 by means such as a pivoting or swiveling connection. As shown in the preferred embodiment in FIG. 2, the top plate 7 is hingably connected to the frame 12. Preferably, the deck 11 also comprises at least one other intermediate plate 14 having top and bottom heating surfaces, disposed between the top cover plate and bottom plate 14. The top cover plate and intermediate plates 14 are hingably mounted, swivelly connected, and disengagably connected to the housing frame 12. Each plate 14 is supported independently by the housing frame 12 and mounted one on top of the other in a clamshell arrangement. Food articles 13 are held inbetween the top and bottom heating surfaces 6 and 8, respectively for heating. The low-temperature cook and staging grill 10 is designated to operate below the boiling point of 212° F., and therefore does not require any atmospheric venting means nor sealing means between the trays or plates 14 when utilized as a cook and staging grill 10. For cook and staging grill 10 applications, the low-temperature equilibration grill 10 does not cause any excessive vapor pressure in the product, i.e. hamburger patty, and maintains the food articles 13 at a selected bacteriologically safe temperature without any moisture loss or degradation of the food. However, the plates 5, 7, 14 in the preferred embodiment are spaced apart from one another and supported by a nonsealing frame 15 surrounding the periphery of the plate 14 in order to contain food articles 13 therein between each plate 14, wherein the food articles 13 are contiguous with the bottom surface 5 and top surface 7 of a pair of plates 5, 7, and 14. As shown in FIG. 2, a means for sealing such as a polymer gasket means 19 may be provided inbetween all or selected plates 5, 7, and 14 as an air and water tight seal to aid in controlling the selected temperature of the food articles 13, prevent contamination, retain moisture, insulate, and maintain the convective equilibration of temperature. Moreover, the top cover plate 7 may be coated with an insulating material to the top surface to insulate the lower plates 5, 14 from ambient temperature conditions and to insulate the user from the heated plates 14 of the deck 11. As shown in FIG. 3, whenever the top cover plate 7 is used having a top heating surface 8, a top cover may be used to cover the top cover plate 7 of the deck 11, to hold in heat and provide a means for warming products using only one heating surface, such as rolls, danish, cookies, or other carbohydrate products to keep them warm and moist.

Figure 9:
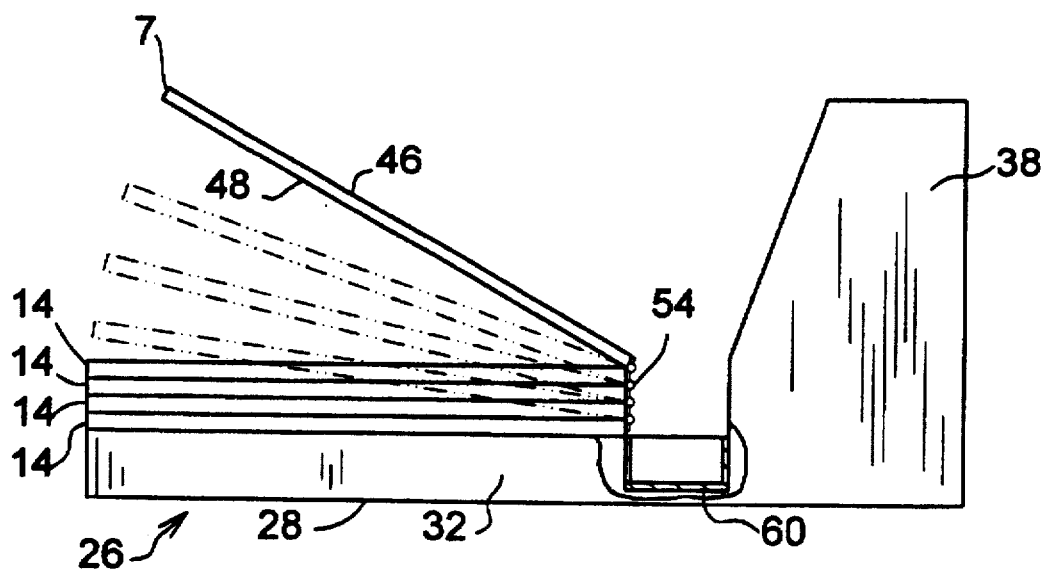
FIG. 9 is a side view of the cook and staging grill of FIG. 6 showing several plates being closed with the top cover plate in the open position.

More particularly as shown in FIGS. 1, 2, and 9, the housing 12 of the preferred embodiment of the clamshell grill 10 comprises a deck 11 of a top cover plate 7 and intermediate plates 14 hingeably supported by a base 26 having a bottom floor providing an optional top heating surface 6, a front side wall 30, a left side wall 32, a right side wall 34, and a rear side wall 36. An instrument control panel 38 is formed integrally with or attached to the front of the base 26 as shown in FIG. 2 or mounted onto a portion of the housing 12 extending above the base 26 such as is shown in FIG. 1.

Figure 10:
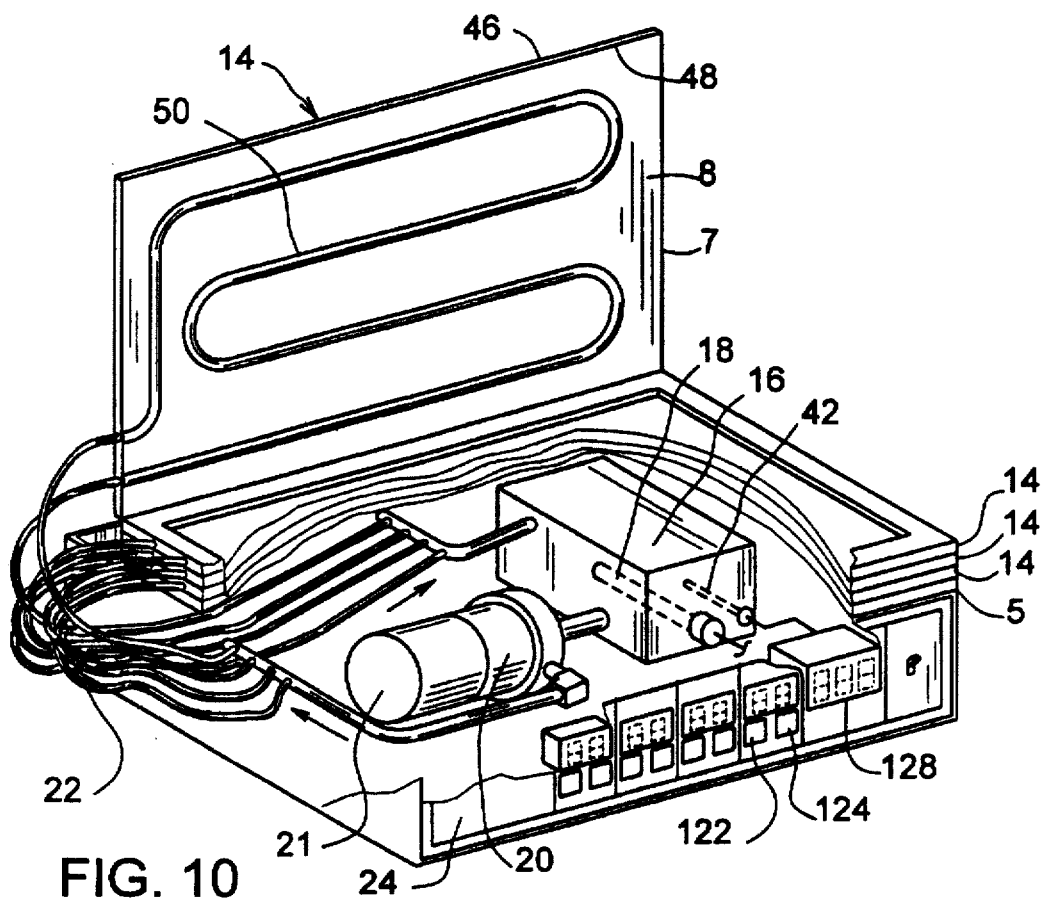
FIG. 10 is a cut-away perspective view of the multi-deck cook and staging grill of FIG. 2, showing some of the components within the housing.
Figure 11:
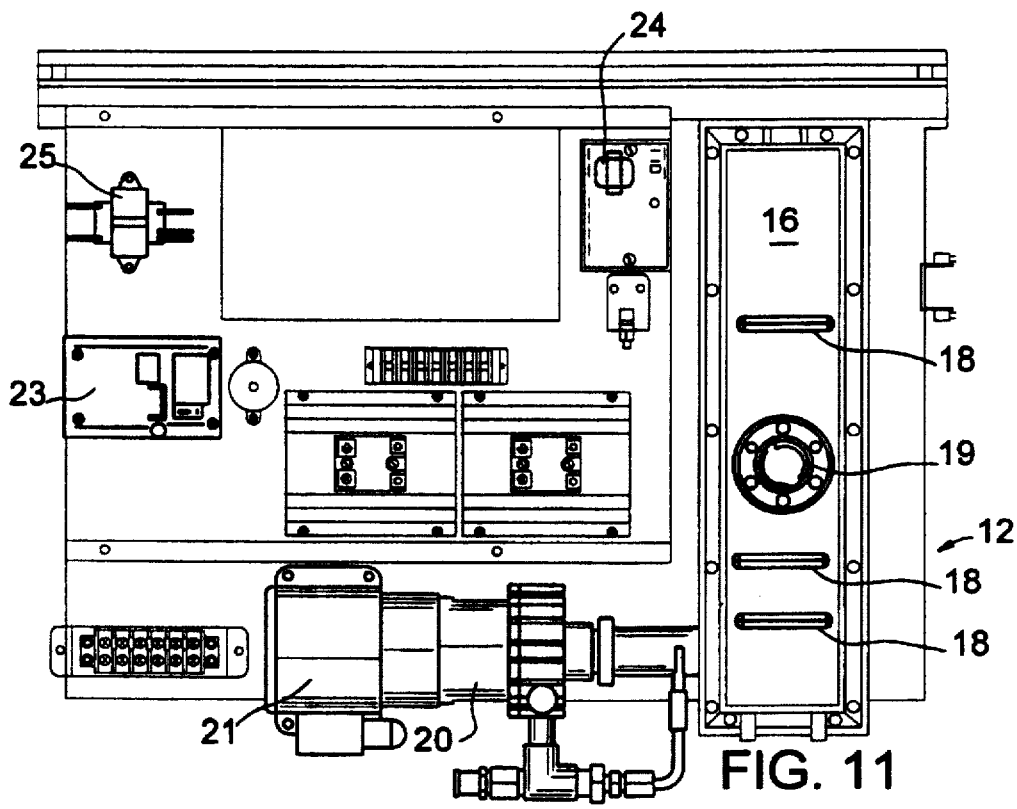
FIG. 11 is a top view of an embodiment of FIG. 10 showing an arrangement of the pump, reservoir, and heating elements therein.
Figure 13:
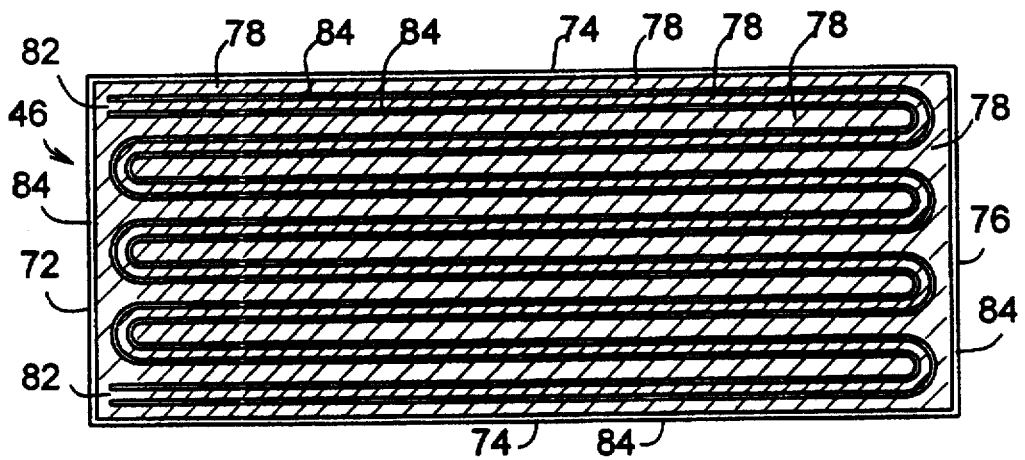
FIG. 13 is a top view of one of an inked sheet showing dark shaded no-weld inked surfaces and the light to-be-welded surface areas of a typical roll bonded panel.
Figure 14:
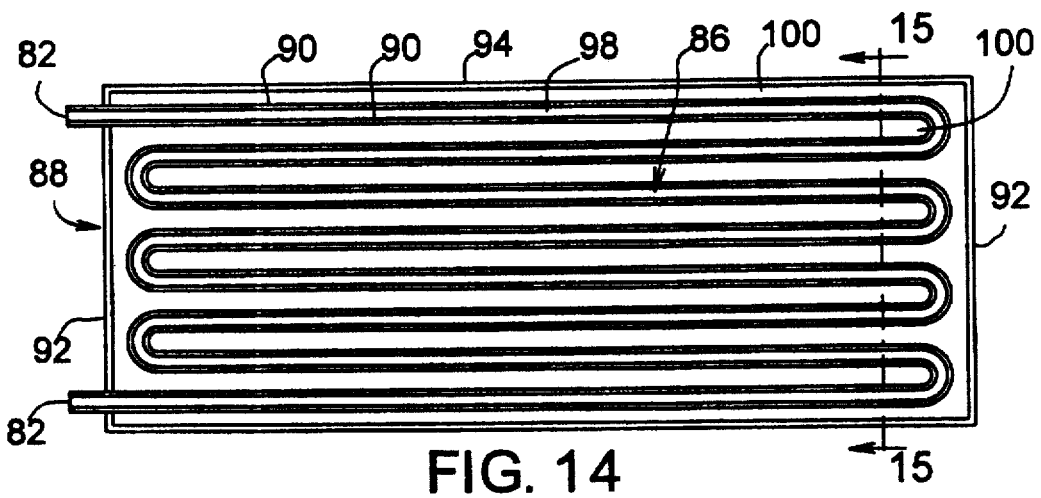
FIG. 14 is a top view showing the heat transfer fluid conduits between the welds of the roll bonded embodiment of the present invention.

As best shown in FIGS. 10-11, the housing contains a reservoir means 16 containing a liquid heat transfer medium. The sump reservoir 16 is designed to receive a volume of liquid heat transfer medium, such as water, or other nontoxic heat transfer liquid. The heat transfer liquid filled through removable cap 19 is continuously circulated between two or more vertically staggered manifold connecting conduit means in a volume sufficient to permit the elevation and maintenance of specific, equilibrated surface temperatures across the plates 5, 7, 14 via the temperature-controlled, low-pressure recirculating heat exchange fluid. The reservoir 16 is fluid-connected to a pump means 20, more particularly a low-pressure magnetic centrifugal pump 20 driven by an electric motor 21 for circulating a low temperature heat transfer fluid, such as water, oil, or food grade glycol, through the trays 14 which are in fluid communication with the pump 20 and reservoir 16 through conduit means 22.

The low temperature heat transfer fluid supplied from the reservoir 16 is heated by a heating means 18 comprising one or more submerged electric heating elements 18 of sufficient voltage ranging between 1.5 kwh and 5 kwh and controlled by electronic proportionate thermocouple-sensitive means to effect a heat surface density to efficiently transfer BTU's from the heat source to the liquid heat transfer medium continuously recirculating through the motor-driven, centrifugal magnetic pump 20. A heating overload safety device 23 is incorporated to maintain the heat transfer fluid at a safe operating pressure and temperature. Furthermore, a fan 25 is provided to cool the circulation and process control equipment.

An electronic, proportionate impulse temperature controller (not shown), is electronically connected to the submerged electric heater means 18 and submerged in the sump reservoir 16 to effect the elevation and maintenance of the heat transfer medium's temperature by energizing the heater at required frequencies, thereby achieving precise control of about ±2° to 5±° F., and if required within the narrow range of ±1° F. over the heat transfer fluid's temperature. In addition, electrical overrun safety means are connected to the electric heater in such manner as to effect safe, instant deactivation of the heater 18, in case a malfunction of the proportionate temperature controller 42 should for any reason occur.

The heat transfer medium is controlled at a precise temperature selected to effect the grill plate 14 surface temperature. The sump reservoir 16 is also equipped with electronic means, comprising at least one controller and at least one thermocouple 42 designed to alternately activate and deactivate the electric heater 18 at frequencies required to effect the maintenance of specific temperatures, within the narrow temperature range in the recirculating heat transfer fluid, thereby guaranteeing precise surface temperature control across the entire plate 5, 7, 14. The heat transfer fluid maintains a constant temperature across the surface of each plate 5, 7, 14 connected to the circulation system, within the narrow range of from ±1° to ±5° F. between the heat exchange fluid entrance and exit ports of the reservoir 16.

The heating and recirculating system supplies the plates 5, 7, 14 of the multi-deck grill 10 with recirculating heat transfer medium, with BTU input sufficient to maintain a selected temperature ranging from room temperature at about 50° F. to about 80° F. to an optional operating temperature of up to 205° F. Emphasis is directed toward the fact that the fluid-connected, recirculating assembly is configured, in its totality, as a closed loop system. The liquid-containing sump reservoir 16 is equipped with a pressure release valve (not shown), or other similar means, in order to allow the closed loop configuration to operate within one to two atmospheres between the reservoir 16 and system pressures. The volume of heat transfer fluid is maintained at a constant pressure and velocity throughout the heat transfer system and control of the temperature of the heat transfer fluid is effected by a micro-second controller connected to the electrical heater means 18 and thermocouple-sensitive means 42 to obtain the most accurate control and quickest response time in order to achieve and maintain the desired temperature of the fluid and plates 14. It is contemplated that the fluid flow rate parameter could be controlled to control the temperature of the fluid as well; however, the process control is more complicated, expensive, and usually less accurate, than by simply controlling the heater means 18. The preferred embodiment of the grill 10 utilizes a single heat transfer fluid reservoir to maintain the same temperature with all of the plates 5, 7, 14;

however, a plurality of reservoirs may be utilized with the controller in order to provide precise different temperatures for selected plates 5, 7, 14. A temperature gradient providing increasing or decreasing temperature ranges for groups of plates 5, 7, 14 from top to bottom or bottom to top may be obtained and controlled with the controller and at least two reservoirs having heat transfer fluid of different temperatures.

As shown in FIGS. 12-25, the low temperature cook and staging grill 10 for pathogenic risk management is constructed of interlocking heat transfer plates 5, 7, 14 formed from at least two sheets of material having heat transfer fluid circulating therethrough as shown in FIG. 13-25. In the preferred embodiment, the integral heat transfer and support means 14 of the multi-deck cook and staging grill 10 comprises at least one and preferably a plurality of horizontal layered interlocking intermediate plates 14 spaced apart from one another in a clamshell arrangement between a top cover plate 7 and bottom plate 5. Each plate 5, 7, 14 consists of a first top sheet 46 and a second bottom sheet 48 of heat transfer conducting material sealingly connected together having at least one fluid channel 50 thereinbetween, such as a conduit or cavity in fluid communication with the reservoir 16 through conduit means such as the hollow tubing 22. Each sheet 46, 48 provides a heat transfer surface for conduction and radiant heat to the food articles 13 disposed thereon or thereinbetween. The heat transfer fluid and surface of the individual plates 5, 7, 14 are controlled at a selected "low" temperature. The plates 5, 7, 14 are designed to effect rapid and uniform low temperature heat transfer to the center of each hamburger patty or other such food article 13.

Figure 8:
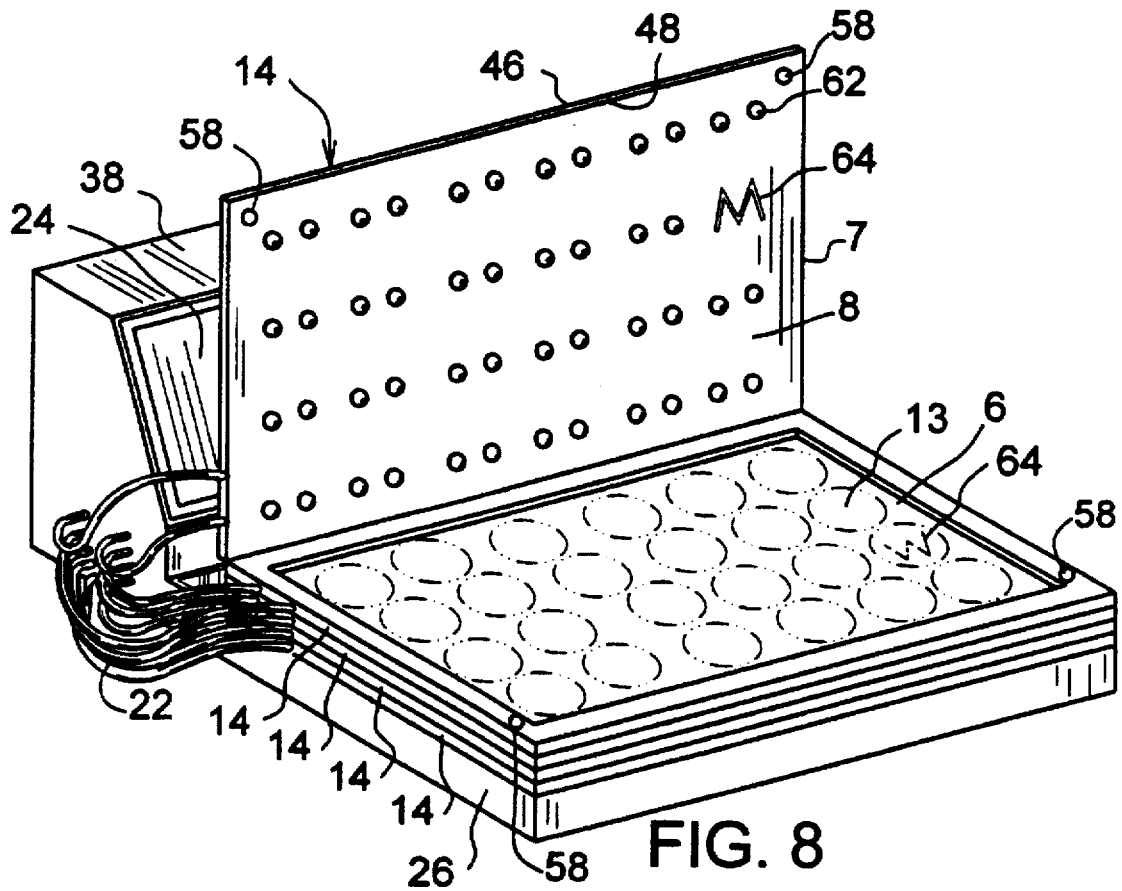
FIG. 8 is a perspective view of the cook and staging grill of FIG. 6 showing the top cover plate in the open position and having protuberances extending from the bottom thereof.
Figure 17:
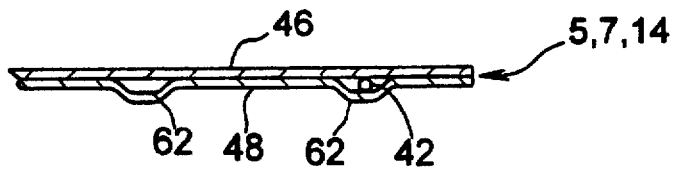
FIG. 17 is a side view of one of the plates of the multi-deck cook and staging grill.

As illustrated in FIGS. 8 and 17, the second bottom sheet 48 of the plates 7, 14 may be formed having a multitude of inflated round or rectangular protrusions 62 of 3/16" to 1/4" in depth for pressing into the upper or lower surface of the heat conducting container of the food articles 13 at designated points, thereby securing the food articles 13, "patties", in position on the plate 7, 14. This prevents movement of the patties 13 when two engaged grill plates 7, 14 are angularly raised for access to the lower plate 5, 14 containing a volume of cooked and hot-held hamburger patties 13 for immediate sale to respective customers. Even when a pair of clamshell grill plates 7, 14 are raised from a horizontal orientation to any angle between about 1 degree and about 60 degrees the patties 13 will remain in position. This novel feature of positional maintenance for food articles 13 placed on a grill plate 14 surface, which surface subsequently undergoes movement ranging from horizontal through a 60 degree angular rise. Moreover, the grill apparatus 10 supplies continuous conduction thermalization to both sides of the food article 13, while simultaneously maintaining its position relative to the grill plate's 14 plane. Furthermore, the selected protrusions 62 may be formed extending outwardly from the bottom second sheet of the plate 7, 14 with a desired insignia or corporate logo 64 for indentation into the sealed heat conducting container holding the hamburger patty 13 by the weight or spring biasing of the plate 7, 14 as shown in FIG. 8.

The ultra thin high heat transfer trays or plates 5, 7, 14 forming the deck 11 of the multi-deck clamshell cook and staging grill 10 may be formed as integral heat transfer and support means by several manufacturing techniques such as by roll-bonding sheets of metal at high-pressure and pillow-expanding the sheets to form a heat exchange plate 14; seam-welding and "weld dotting" (i.e., spot-welded) two sheets of metal forming a high pressure plate 14; and an aluminum roll bonding seam welding concept may be deployed to achieve the identical, "pillowed" expansion format having deep cavities.

Preparation of the roll bonded plates 5, 7, 14 requires taking two sheets of precision aluminum; cleaning and decreasing the sheets; printing a pattern for the fluid-flow tube circuit on one side of one sheet by silk screening; preheating both sheets; metallurgically bonding the two sheets together in a roll mill forming a panel therefrom; annealing the bonded sheets; inflating the fluid-flow channels to specification height by using high pressure air which expands the silk screened areas between the sheets; blanking the panel; and attaching connector tubes to the expanded roll bonding such as by flame brazing.

More particularly, as shown best in FIGS. 13-16, the roll bonded plate 5, 7, 14 comprises a first sheet 46 and a second sheet 48 of aluminum stock of either the same or dissimilar gauge (i.e., thickness). The first sheet 46 is prepared by silk screening the desired circuit on the sheet using a "no-weld" ink 66 such as a graphite coating, reflecting a specific fluid path pattern design. The "no-weld" ink 66 is applied to selected portions of a first blank sheet 46 of thermally conductive aluminum stock having a first sheet top surface 68, a first sheet bottom surface 70 (shown in FIG. 11), a first end 72, opposing sides 74, and a second end 76. The first sheet 46 generally has a thickness of about 60/1,000 to about 65/1,000 of an inch and are compressed during the roll bonding process to have a finished product having a wall thickness in the range of about 0.020 to about 0.030 of an inch thick.

The no-weld graphite ink 66 is applied to the no-weld areas 78 of the first sheet top surface 68 of the first thermally conductive sheet 46 to form a parameter inked weld-line drawn around the edge of the no-weld area 78 of the first sheet 46 leaving a small connector opening 82 at each corner. Application of the no-weld graphite ink 66 to selected interior portions of the first sheet 46 forms a pair of non-inked interior weld lines 84 drawn spaced apart equal distance from one another to create a serpentine shaped heat transfer liquid circuit pattern 86 outlined on the top surface 68 of the first sheet 46.

Figure 12:
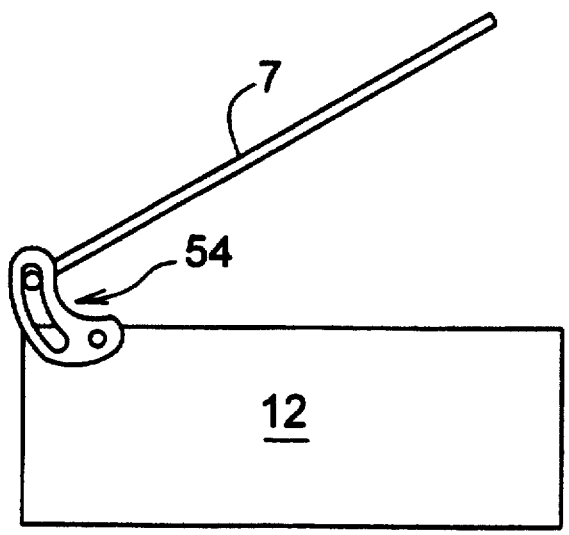
FIG. 12 is a side view of one embodiment of a simple floating hinge providing a means for pivotally connecting the top cover plate and intermediate plates to the housing and providing a means for equal spacing and alignment of the plates when in the "in-use" horizontal position to control the distance between each plate.

A second thermally conductive companion blank sheet 48 (not shown) of the same size and thickness as the first sheet 46, having a second sheet top surface 68, a second sheet bottom surface 70, a first end 72, opposing sides 74, a second end 76, and a thickness of about 60/1,000 to about 65/1,000 of an inch is aligned with the first sheet 46 and the second sheet bottom surface 70 is placed in contact with the inked top surface 68 of first sheet 46. The inked no-weld surface areas 78 of inked sheet 46 placed together with the un-inked sheet 48 forms a double sheet panel 88 as shown in FIG. 12 having a serpentine shaped circuit pattern 86. The non-inked lines 84 are welded together; however, the no-weld graphite ink 66 separates the top surface 68 of sheet 46 from the bottom surface 70 of sheet 48 in the no-weld areas. Almost any continuous pattern could be inked providing channels or cavities for a particular application.

The panel 88 is heated to approximately 600° F., and moved through a rolling mill under high pressure, typically one to ten tons pressure per square inch gauge, such as described in U.S. Pat. No. 2,690,002 by Grenell, hereby incorporated by reference. The high pressure roll bonding process reduces the thickness of the panel 88 by approximately 60% so that each sheet 46 and 48 is about 0.020 and 0.080 of an inch thick and preferably about 0.025 of an inch thick. The roll bonding process hermetically bonds the non-ink-coated weld line surface areas 84 of the panel 88 together forming a welded double sheet roll bonded panel 89 having interior weld joints 90, end perimeter weld joints 92, and side perimeter weld joints 94.

The roll bonded panel 89 is then placed between a pair of platens and connected to a pressurized gas supply means via the connector opening 82. Upon completion of this high-impact bonding process, the solidly bonded, double-thick plate 14 is pierced, at an appropriately designated position, directly into the non-bonded graphite pattern, and the pillow pattern is then expanded (inflated between platens) with a high pressure gas such as nitrogen or air to a predetermined amount forming conduits 98 conduits 100 between the welds 90–94 forming a roll bonded heat transfer circuit or plate 14 and creating a precisely engineered path of heat transfer fluid travel across the entire heat exchange plate 14 which also serves to support the food articles thereon.

Roll bonding aluminum sheets 46, 48 provides substantially flat top and bottom surfaces on the first and second sheets 46, 48. The liquid heating fluid channels 50 are designed to allow maximum liquid heat transfer evenly distributed through the entire surface of the plate, achieving by their liquid transfer channels 50 the maximum uniform heat transfer on the entire plate 14 surface within a narrow temperature range.

Figures 15, 16:
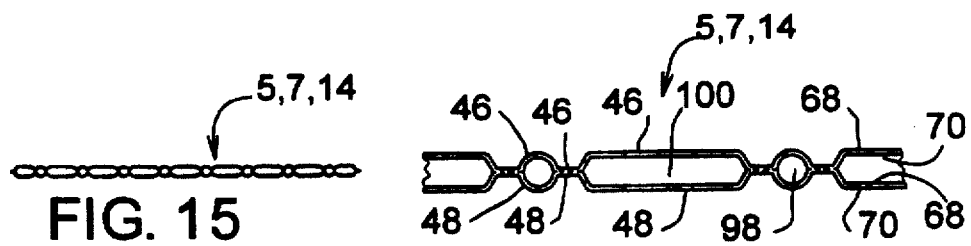
FIG. 15 is a cross-sectional view of a plate along lines 15–15 showing the heat transfer fluid conduits of the double sheet roll bonded panel forming a tray of the present invention.
FIG. 16 is an enlarged view of FIG. 15.

FIGS. 15 and 16 show a cross-sectional view of an embodiment of a roll bonded plate 5, 7, 14. As shown in the enlarged cross sectional views of FIG. 16, the top sheet 46 can be formed having a smooth surface or having creases 96 therein at the point of the welds 90–94. FIG. 15 shows a roll bonded panel having a plurality of conduits and dimples formed therein to control the flow of the fluid therethrough.

A continuous process for roll bonding aluminum is set forth in Alcan Aluminum's, Algood Aluminum Subsidiary Engineering Information Bulletin, Algoods Roll-Bond engineering Guideline Bulletin, and Society of Automotive Engineers, Inc., ("SAE")'s Bulletin No. 830023 the disclosures of which are incorporated herein by reference.

Mueller's Temp Plate® Bulletin, the disclosure of which is incorporated herein by reference, is fabricated by resistance seam-welding, resistance spot-welding, and arc welding techniques by taking two thin metal sheets and by welding a seam around the outer edges and in a selected pattern between the two sheets bonding the sheets at the weld junction.

Resistance spot welding requires pressing two sheets of metal together. Two electrodes are used to apply a current through the two sheets of metal. Due to the resistance to electrical flow at the metal contact surfaces, the area therein between heats up and forms a small molten puddle. As the pressure is retained and the current shut off, the molten puddle freezes forming the weldment between the two metal sheets such as shown in FIGS. 19–24. Resistance seam welding is produced by a series of overlapping spot-welds. Current passes through the metal as a wheel shaped electrode rolled over the sheets held together by pressure. The width and length of the spot welds can be controlled by the width of the electrode and the current on-off time.

Figure 18:
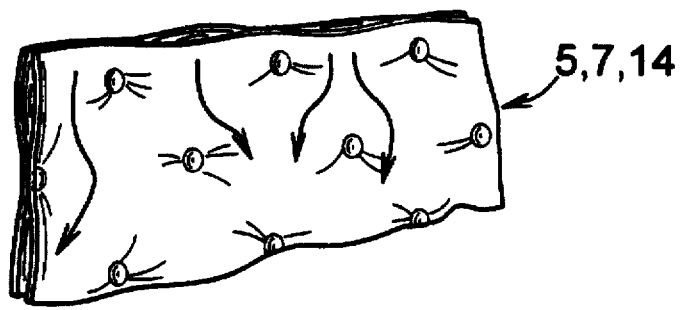
FIG. 18 is a perspective view of a thin heat transfer plate of the present invention produced by resistance welding multiple spot welds at the desired points to increase the strength of the plate increase the heat transfer between the sheets and the heat transfer liquid circulating therethrough in a free flow pattern.
Figure 19:
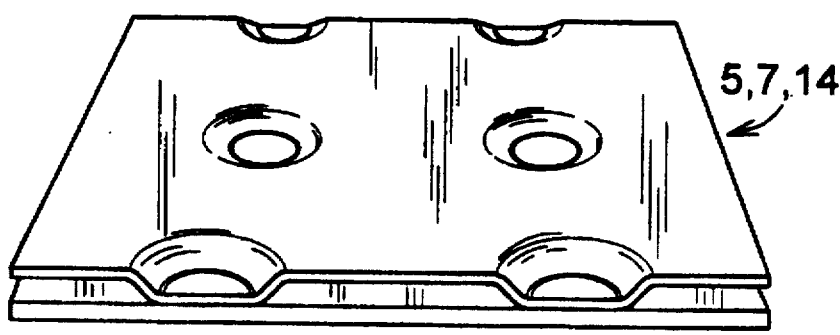
FIG. 19 is a perspective view of a dimple one sided plate.
Figure 20:
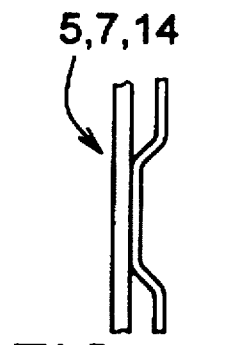
FIG. 20 is an enlarged front plan view of the dimple one sided plate shown in FIG. 19.

Multiple spot welds may be formed between the two sheets at the desired points to increase the strength of the plates 5, 7, 14 formed thereby, and increase heat transfer between the sheets and the liquid circulating therethrough in a free flow pattern as shown in FIG. 18. The specially designed heat transfer plate 5, 7, 14 configuration may utilize sheets 46, 48 which are spot-welded and high-pressure expanded with one side flat with the second side slightly pillowed or dimpled. The dimple one sided plate 5, 7, 14 is constructed by machine punching and swaging the sheets prior to welding to increase the flow area in the passages thereinbetween as shown in FIGS. 19 and 20.

Figure 21:
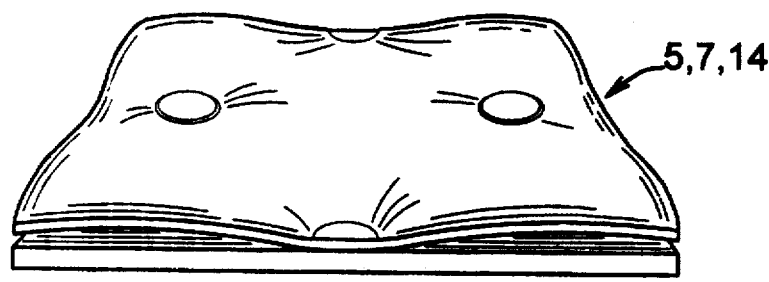
FIG. 21 is a perspective view of an inflated one side plate having a single embossed surface.
Figure 22:
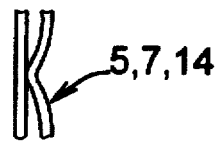
FIG. 22 is an enlarged front plan view of the single embossed surface plate shown in FIGS. 22.

The resistant welding techniques may also be employed to produce a single embossed surface plate 5, 7, 14, wherein the plate 5, 7, 14 is comprised of two sheets of material of different thicknesses and one side is inflated as shown in FIGS. 21 and 22 providing a flat surface on one side of the plate 14.

Figure 23:
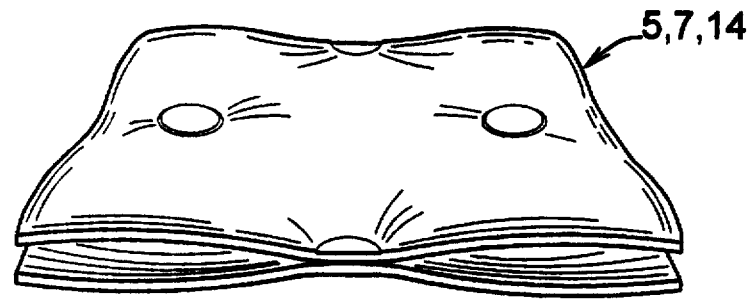
FIG. 23 is a perspective view of an inflated both sides plate having a double embossed surface.
Figure 24:
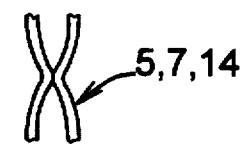
FIG. 24 is an enlarged front plan view of the inflated doubled embossed surface plate of FIG. 23.
Figure 25:
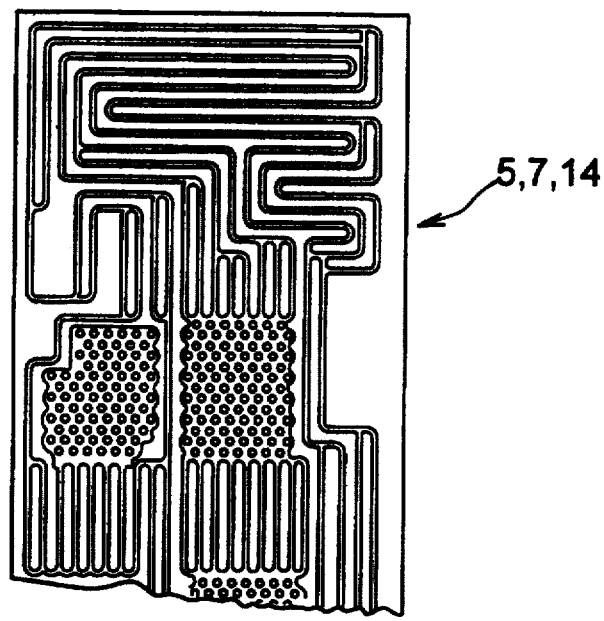
FIG. 25 is a top view of a roll bonded panel showing a circuit formed having a plurality of conduits and dimples formed therein.

The resistant welding techniques may also be employed to produce a double embossed surface plate 5, 7, 14, wherein the plate 5, 7, 14 is comprised of two sheets of material of different thicknesses and both sides are inflated as shown in FIGS. 23 and 24.

The above described manufacturing techniques are further enhanced by the option of subjecting the impact-bonded, or rollbonded aluminum plate 5, 7, 14 to deep-drawing operations. In the deep drawing procedure, the entire roll-bonded plate 5, 7, 14 is pulled by vacuum into a mold forming a deep-drawn or deep-well plate 108 according to the desired shape of the mold.

Figure 26:
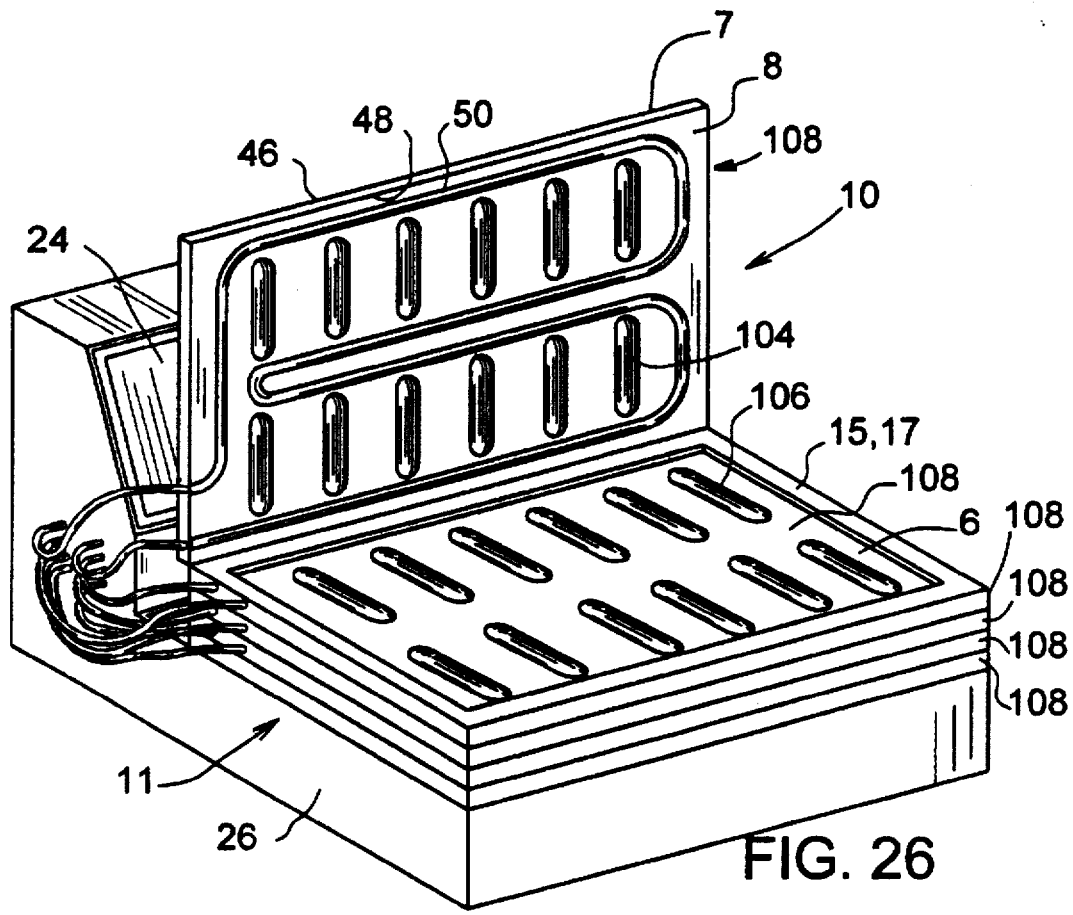
FIG. 26 is perspective view of cook and staging grill of FIG. 2, showing plates formed having depressions for containing food articles therein between the plates.
Figure 27:
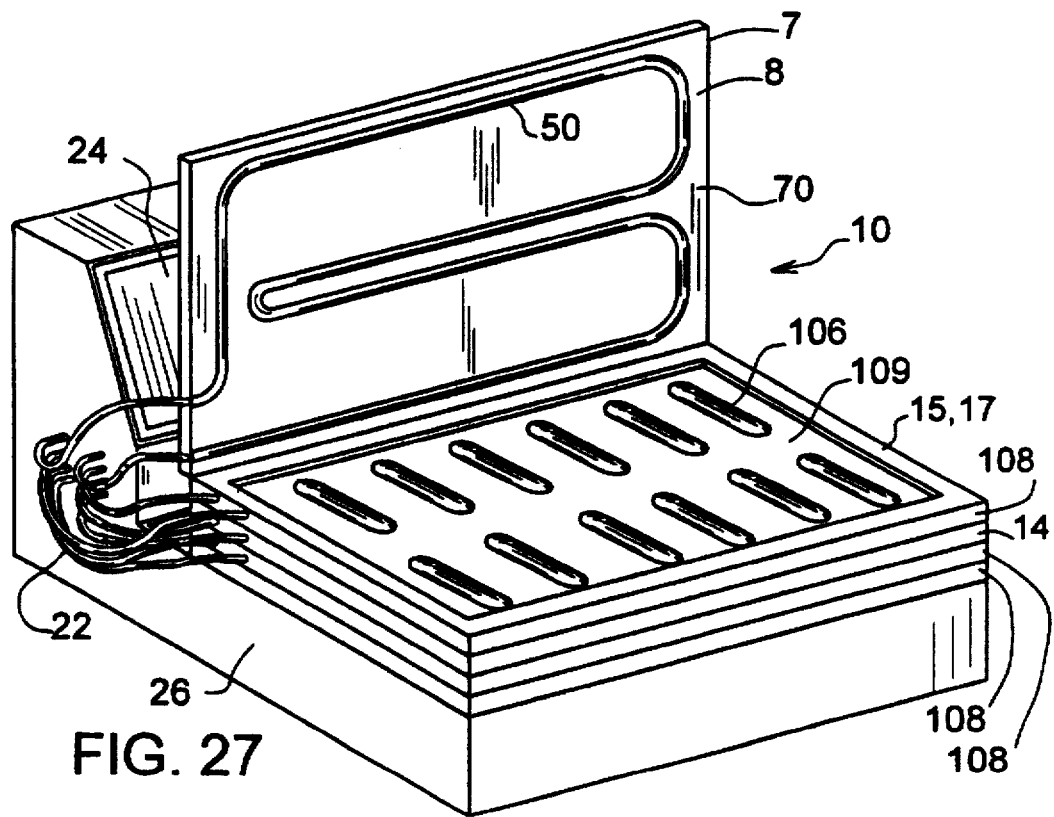
FIG. 27 is perspective view of cook and staging grill of FIG. 26, showing smooth plates in combination with plates formed having depressions for containing food articles therein between the plates.

Depressions 104 formed within the deep-drawn tray 108 of the present invention may be designed to form shallow vessels 106 having raised walls ranging from about ½ inch to about 14 inches deep in one or both sheets 109, 111, and still maintain the thin high heat transfer advantages of the flat roll bonded plate 14 as illustrated in FIGS. 26 and 27. The vessel(s) 106 produced may be formed having a shape that is round, elliptical, rectangular, or any desired food shape configuration.

For example, as shown in FIG. 26, oblong shaped vessels 106 may have depressions 104 which extend downwardly from the deep-drawn first top sheet 109 and upwardly from the deep-drawn second bottom sheet 111 wherein the vessels 106 are arranged in a staggered formation between the deep-drawn trays 108. As shown in FIG. 27, the cook and staging grill 10 may have a combination of formed deep-drawn trays 108 containing vessels 106 formed between flat plates 14 and deep-drawn plates 108, or vessels 106 formed extending downwardly from a deep-drawn first top sheet 109 toward a flat first bottom sheet 70, wherein the thickness of the frame 15, 17 provides a spacing and sealing means between flat plates 14 and the formed deep-drawn trays 108. The deep-drawn plates 108 may also having additional heat transfer capacity due to having a greater surface area in contact with the heated food article 13. The deep-drawn trays 108 may be designed to heat the vessel 106 and food products 13 contained directly in the vessel 106, or to heat food contained in a prepackaged container, such as a frozen "TV" dinner or soup, held within the vessel 106 to a cooked equilibration temperature of up to 205° F., ±1° F., from a frozen state, refrigerated state, or ambient state. The process is applicable to precooked, or fresh to-be-cooked food articles 13.

Figure 7:
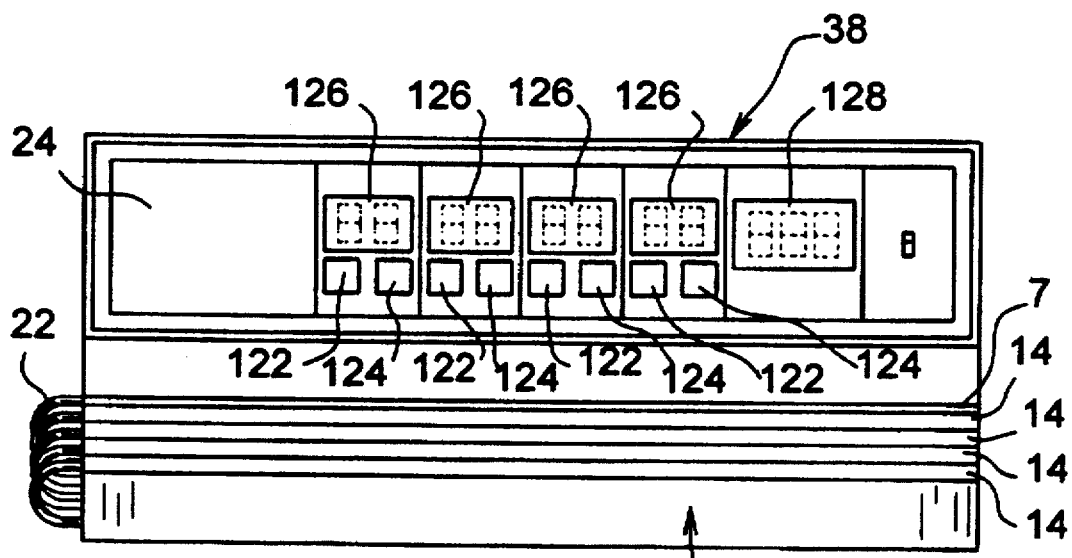
FIG. 7 is a front view of the cook and staging grill of FIG. 6 showing the plates in the closed position.

FIG. 26 is perspective view of cook and staging grill of FIG. 7, showing plates formed having depressions or vessels 106 for containing food articles 13 therein formed between the deep-drawn plates 108. As illustrated in FIG. 26, the formed heat exchange deep-drawn plates 108 can be designed to receive round or elliptical food articles 13 (such as hot dogs, knockwurst, sausage and brats), whereby two contiguous plates 108, each conforming to a half-diameter of a food product 13, oppose each other in such manner that the half-diameter profile configurations will surround the round or elliptical food article 13, thereby enabling the food article 13 to be placed between the two plates 108 for high-speed thermalization and staging procedures into the conductive equivalent of a round (or elliptical) configuration. This unique and novel heat exchange design, under which food articles 13 are thermalized via recirculating heat exchange fluids in pillow-expanded, fluid-traveling channels within the formed plates 100, provides far greater food safety during thermalization and staging processes, than the currently utilized, heated "rolling pin" or hot water devices now in practice for this purpose in the industry.

The cook and staging grill 10 is designed to retain food articles 13 in a clamped state or a nested state, via either horizontal or vertical fastening mechanisms, such as the floating hinges 54, for the time period required to assure sufficient internal product temperature equilibration (i.e., the time period required to meet the time-temperature pathogen lethality curves determined by the USDA and FDA to guarantee effective pathogenic risk management). Under the federal guidelines for thermal kill of food-borne pathogens, wherein food articles are rendered safe for consumption by exposure to required temperatures for minimum time spans, the opportunity to stage (i.e., hold) the food articles 13 for extended time periods and to serve same as dictated by customer demand is accomplished efficiently with the cook and staging grill 10 of the present invention.

The control process for the cook and staging grill 10 is accomplished by connecting the thermally conductive grill plates 14, 108 to an electronic monitoring means. Moreover, in the preferred embodiment, the control means comprises a computerized control system and alarm system 24 controlling the process and recording the time and temperature variables for the multi-deck cook and staging grill 10. Each cook and staging grill plate 5, 7, 14, 108 may have one or more thermocouples 42 and/or thermocouples may also be inserted into one or more of the food articles 13 for measuring internal product temperature, in order to achieve the most critical functions of control over specific, pathogen lethality time-temperature exposures and subsequent cook and staging periods. Moreover, each thermocouple 42 may be connected (i.e., imbedded or attached) to a selected protrusion 62 on the underside of the grill plate 14, 108 for contacting and pressing into the heat conducting container containing the food article 13 placed in that position, permitting measurement and on-site read-out of its internal temperature. Furthermore, the thermocouple 42 is capable of delivering constant internal product temperature-monitoring information through an electrical connection means such as an electrical cable (not shown) from its position on the lower grill 10 surface's protruding member 62 to a microprocessor unit or computer 114.

Figure 4:
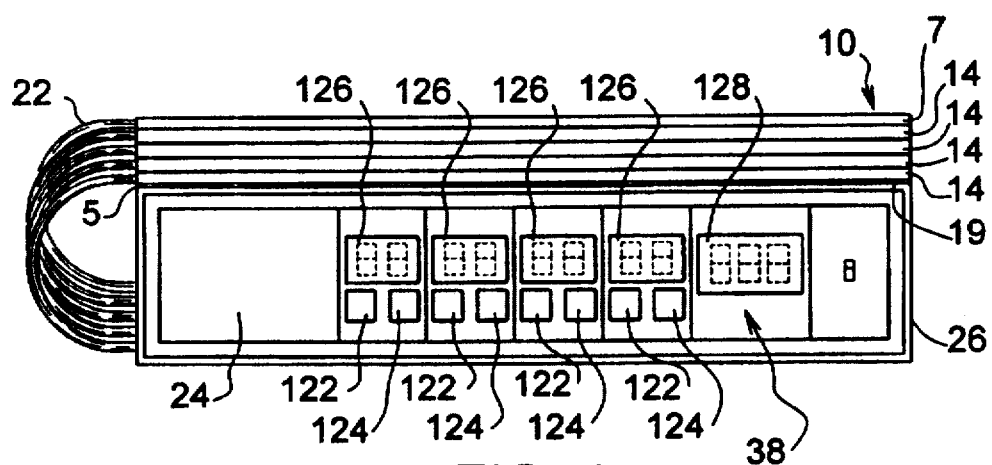
FIG. 4 is a front view of the cook and staging grill of FIG. 2 showing the plates in the closed position.
Figure 5:
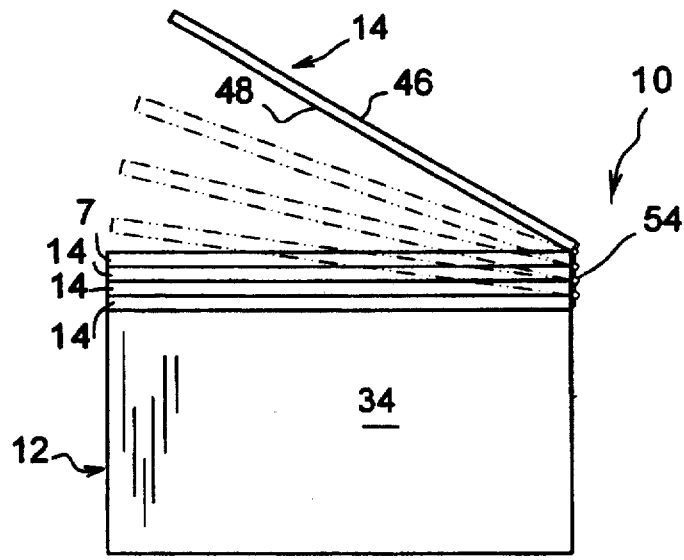
FIG. 5 is a side view of the multi-deck cook and staging grill of FIG. 2 showing several plates being closed with the top cover plate in the open position.
Figure 6:
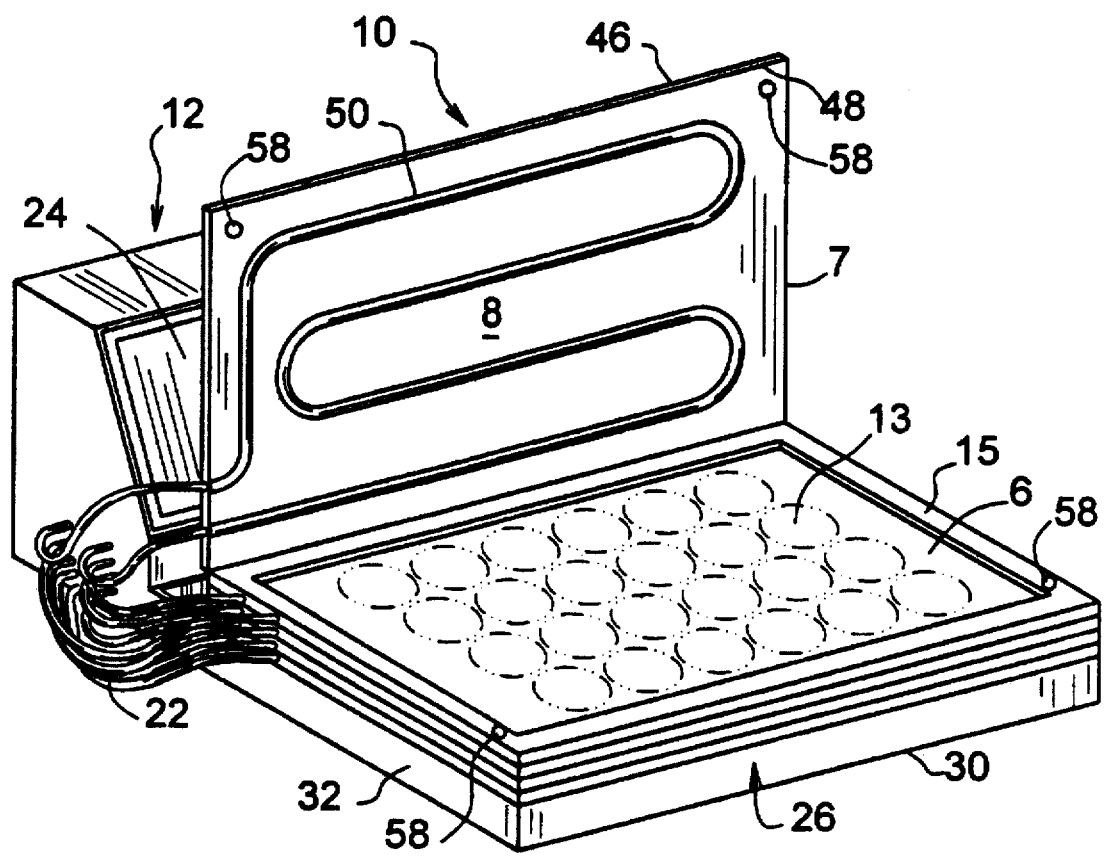
FIG. 6 is a perspective view of showing an alternate embodiment of the cooking and staging grill with the stacked interlocking top cover plate being open, and showing a heat transfer conduit and meat patties in phantom lines, wherein the control panel is mounted upon the rear portion of the base of the multi-deck cook and staging grill rather than located in the front portion of the base as shown in the embodiment of FIG. 2.

The computer 114 controls the process and receives output data from the pump 20, heater 18, and timer 116. The computer 114 records the time, temperature, and batch data from at least one limit switch (not shown) electromechanically linked to at least one safety lock, preferably a magnetic lock 58 for each individual plate or tray 5, 7, 14, 108. The computer 114 in the preferred embodiment is adapted to process input from up to ten thermocouples 42 in contact with the food articles 13 for precise monitoring or the internal product temperature throughout the cook and staging process continuously or at specified time intervals. The temperature in measured microseconds and displayed on the instrument control panel 38 with LED or other light displays, such as shown in FIG. 4, containing red (in process) indicator lights 122, green (ready to serve) indicator lights 124, time indicators 126 for each individual tray, and at least one temperature indicator 128 which can indicate the temperature of any individual thermocouple 42 or for each tray 14, 108. It is contemplated that each tray 14, 108 may have an individual temperature indicator 128. Upon closing the plates 7, 14 containing food articles 13, the magnetic lock becomes engaged and the red light indicator 122 comes on. During the heating cycle the red indicator light 122 remains on and the rising temperature of the tray 14 is observed through the temperature indicator 128. When the food articles 13 have reached the desired preset temperature for the desired preset time the temperature indicator will indicate the equilibration temperature has been reached, the green indicator light 124 will turn on, the red indicator light 122 will turn off, and the magnetic lock 120 is released or rendered releasable permitting the tray 14 to be opened and raised providing access to the food articles 13 for serving. The computer 114 records the time and temperature data providing proof that the food articles 13 were processed in the cook and staging grill 10 for at least the minimum time and temperature necessary to achieve thermal lethality for the pathogenic bacteria or for the desired time and temperature parameters needed to achieve thermal lethality of any other pathogen and guarantee a safe food product 13 for the consumer.

Using the clamshell cook and staging grill 10 of the present invention involves a simple procedure due to the automation and control of the device. For example, the cook and staging grill 10 is preheated to about 160° F. Frozen ¼ pound meat patties, such as a hamburger patties, beef, pork, chicken meat, egg or vegetable patties encased in heat conducting air evacuated hermetically sealed plastic pouches or other containers, at about 0° F. to about 40° F. are placed on the upper heating surface of a first plate 5, 14 and a second upper plate 7, 14 hingably connected thereto is closed holding the meat patties thereinbetween. Closing the plate 7, 14 activates the thermocouples 42 and temperature indicators 128, red in process light 122, timer 116, magnetic lock 120, and computerized controller and alarm system 24. The preheated plates 5, 7, 14 heat the meat patties to about 160°±5° F. or ±2° F. if necessary, in about ten to about 17 minutes. The time and temperature is recorded by the microprocessor 24 and shown visually on the indicators 128. The computer 24 monitors the process and records the temperature of the hamburger patties on each tray 14. Upon reaching the preselected temperature of 160° F. a green indicator light 124 flashes and an audible alarm sounds indicating the hamburger patties are fully cooked, pathogenically safe, and ready for serving. The lock 120 is disengaged and the plate 7, 14 is lifted manually or automatically by a mechanical device.

Figure 28:
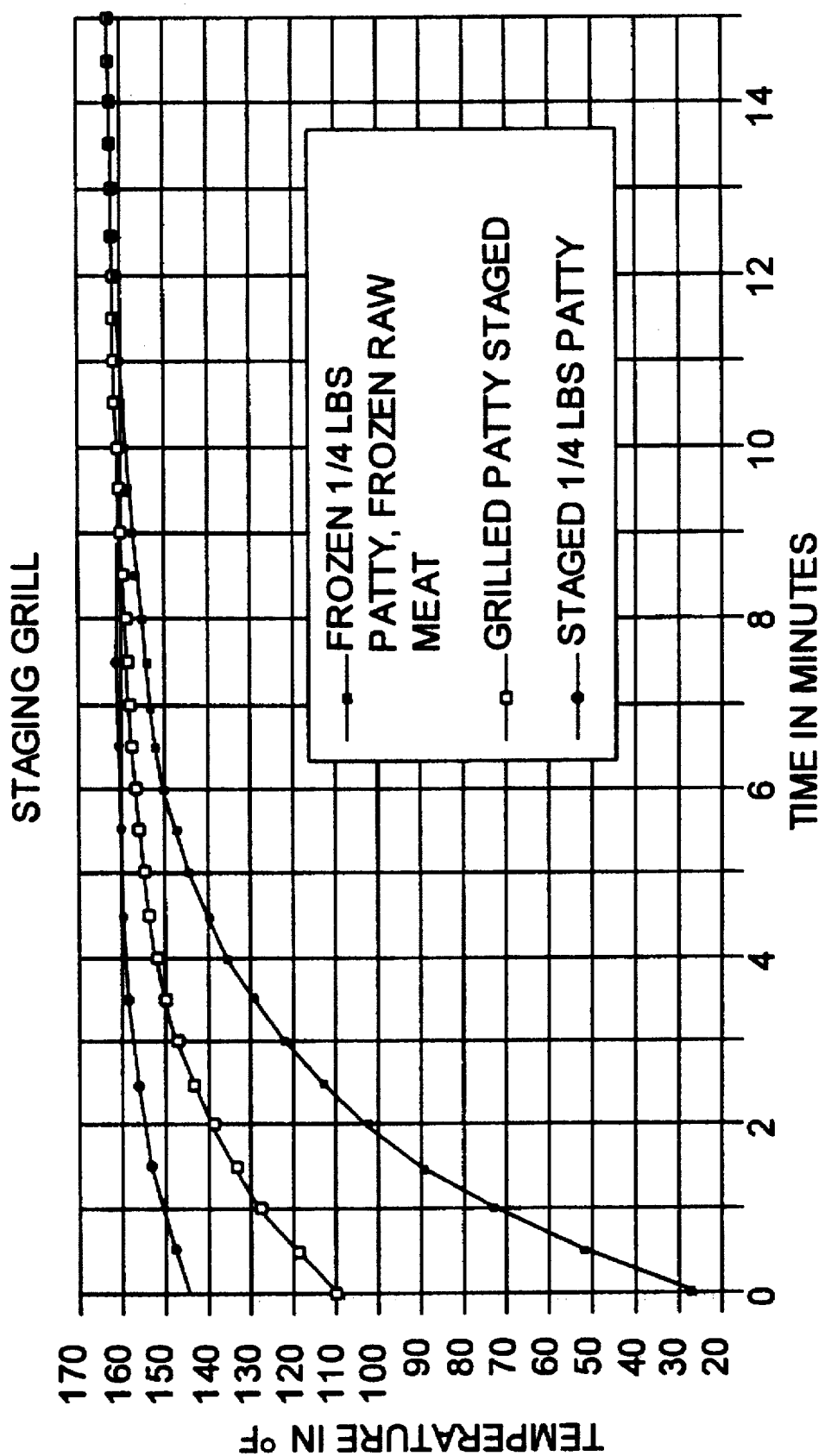
FIG. 28 is a graph showing the time versus temperature relationship for heating frozen meat patties using the present invention.

As illustrated in FIG. 28, a temperature and time graph shows typical curves produced using the cooking and staging grill 10 wherein frozen ¼ pound meat patties or chilled fresh raw meat patties at about 0° F. to 30° F. are heated to about 160° F. in about ten to seventeen minutes; pre-grilled patties are heated from about 110° F. to about 160° F. in about eight minutes; and staged ¼ pound meat patties are heated from about 155° F. to about 160° F. in about five minutes. The cook and staging grill 10 is capable of maintaining the selected temperature and product therein in first quality condition from up to about four to about six hours.

Moreover, the computer 114 is connected to a computerized temperature monitoring data transmitter 130. The data transmitter 130 transmits accurate, up-to-the-minute temperature-monitoring information, from any individual restaurant, to a central data recipient, thereby enabling regulation and monitoring of compliance and comparative efficiency, at separate retail outlets, by the central data recording entity.

The heretofore identified apparatus and processing procedure is especially adaptable in combination with heat conducting containers comprising disposable, vacuum formed, extruded, fill-formed and otherwise suitably constructed containers, such as hermetically sealed pouches made of petrochemical-derivative plastic films, in singular or co-extruded laminates. The use of pre-filled food containers is designed to serve triple and quadruple operational functions supporting the optimum management of food safety risks of pathogenic origin and guaranteeing the inhibition of carcinogenic and mutagenic toxicity generation during thermalization of protein food articles. Such food articles 13 include ground red meat, (i.e. hamburger patties), and similar food articles processed from chicken, turkey, duck, pork, and other suitable raw materials, certified by the U.S.D.A. as being safe for public consumption. Processing of these food articles encompasses an interdependent and sequential series of functions consisting of the filling, processing, packaging, freezing and distribution of the pre-filled containers or pouches. Moreover, the thermalization and staging of these food products within the prefilled containers is accomplished at retail through all time-related operational procedures culminating in the instant of food article removal from the package for retail customer consumption in optimum food safety and quality format.

Furthermore, the described apparatus and process provides a practical means of boiling food in the bag, which has found limited application in the retail food marketing sector. The apparatus and process are also applicable to the more sophisticated mode of preparing and cooking refrigerated foods in plastic pouches, a process developed in France and designated as Su-Vide. Each of these conventional processes advocates and demonstrates certain benefits achievable by submerging, for cooking purposes, pouched food articles for limited time spans in boiling (i.e., 212° F.) water. There is no conventional grilling technology currently available which will supply selectable grill surface conduction temperatures within the range of 150° to 185°, at precise increments of ±1° F. in surface equilibration temperatures as described and claimed in the instant application. Based on these state-of-the-art practices, and the processes and technical means prevailing worldwide in the industry, no technical precedence now exists for demonstrating the following new, novel and unique functions, using readily available plastic films (already approved by the USDA and FDA for contact with food products). These readily available pouches range in thickness from 1 mil to that required for any desirable package configuration, and achieving consistently controlled pasteurization in a single-portion, tamper-proof and easily servable consumer product format.

Moveover, the raw food article is conventionally packaged and sealed hermetically. The package is designed to contain the food product (i.e., hamburger patty or other food article) and to provide it with a vacuum-molded, meat juice drainage reservoir compartment. The food article may be first frozen and then packaged, or frozen by IQF procedures once in the package. The sealed, frozen package boasts a shelf life of 6 to 12 months. Upon consumption demand at retail, the frozen food article (in the sealed package) is placed in the multi-deck equilibration and staging grill 10 for speedy, precision thermalization, quickly reaching a constant (i.e., equilibrated) 165° F. internal temperature. If necessary, food products may remain in the multi-deck grill for prolonged staging periods. The thermalized food article, in the sealed plastic heat conducting container, is now ready for consumption. If staged in the grill 10 for prolonged periods, the food product's quality and safety attributes are preserved, with no loss of either moisture or nutrients, and the article is eventually dispensed in optimal food safety and quality condition. No plastic container can survive the high temperatures of conventional grill surfaces, ranging from 300° to 450° F., as compared to the low-temperature, multi-deck conduction grill 10 herein highlighted. The new and novel concept of converting a plastic film package from a passive protective device to a "cooking pot," "oven" and "staging chamber" for pasteurization of food articles is justified by its practical interdependence on the low-temperature, multi-deck grill 10, allowing for optimum pathogenic risk management pathogenic bacteria such as E. coli 0157:H7, Listeria and Salmonellae bacteria and thus avoiding any mutagenic or carcinogenic toxicity generation in the sealed pouch format within temperature ranges between 165° and 185° F., in selectable increments of ±2° F. The above broadly highlighted operational sequences are intended to assist the reader in fully grasping the significant ramifications of this unique system on consistent food safety achievement during cooking and staging, thereby dissipating the hasty, irrational assumptions formed in response to the suggestion that cooking of food articles sealed in plastic pouches made of conventional, open-faced or clamshell grill, as practiced worldwide by the food service industries, is practicable. By combining new and novel packaging formats containing specifically formulated protein and carbohydrate food articles, and by ultimately subjecting said uniquely packaged, frozen food articles to the patented, state-of-the-art, precision low-temperature conduction thermalization and staging grill technologies, we introduce a mass feeding format offering significant impact on food safety and cost containment objectives affecting the profit margins in the mass feeding industries, with positive global marketing consequences.

A heat conducting container suitable for packaging, freezing, storage and thermalization (i.e., cooking and staging) of protein patties in packages made of suitable odorless plastic films, ranging in thickness from 1 to 10 mils has been developed especially for use with heating food articles 13 held within. The packages are approved for food contract by the FDA, with appropriate clarity and oxygen barrier properties, and sufficient tensile and elongation strengths and elasticity. One such suitable plastic film, manufactured by Eastman Chemical Products, Inc., of Kingsport, Tenn., is that extruded from KODAR® PETG copolyester 6783.

Packaging requirements for food products designed for application in the multi-deck, low-temperature (165° to 185° F.) cooking and staging thermalization technology can incorporate the least costly of all packaging materials approved by the FDA for food contact, given the fact that our low-temperature thermalization process does not initiate any appreciable vapor pressure within the sealed heat conducting pouch containing the food article. Boil-in-the-bag and microwaveable food packaging containers must be specially designed to offset any operational hazards associated with explosion of containers due to vapor pressures generated internally during the boiling or microwaving reheating function.

FIGS. 29–56 show the present invention and embodiments of hermetically sealable plastic pouches for containing food articles for use therewith.

Figure 29:
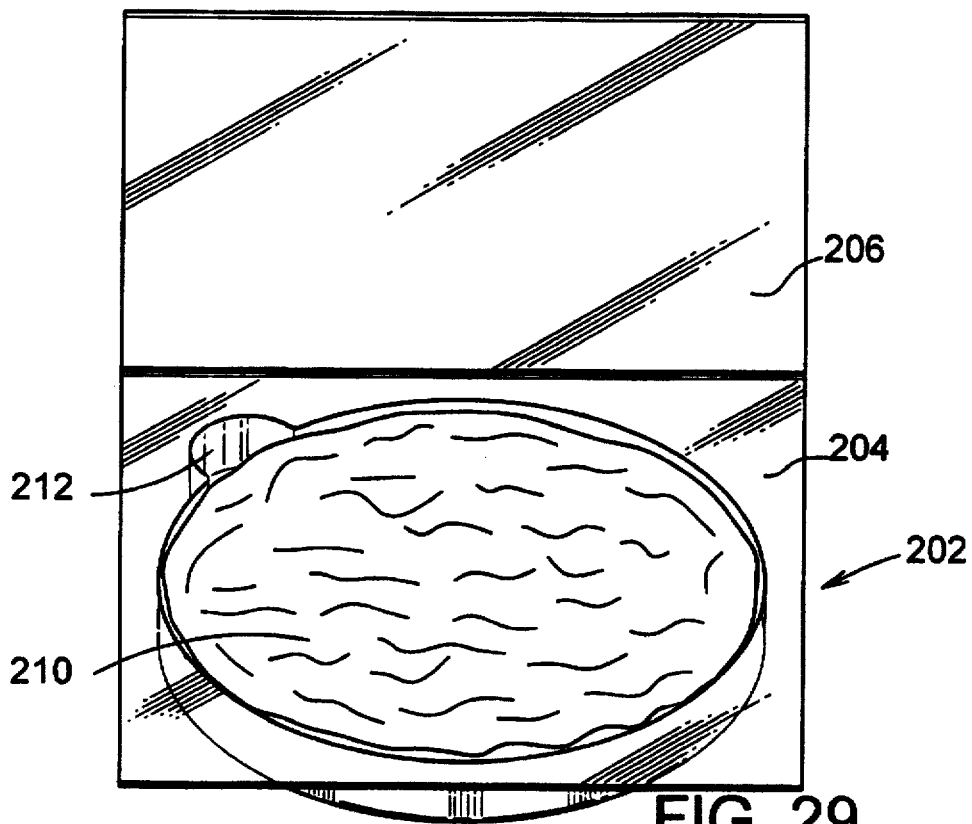
FIG. 29 is a perspective view showing a plastic pouch having a round first compartment for holding the food article and a generally semi-circular second compartment for holding the juices formed from heating the food article.

More particularly, FIG. 29 shows a plastic pouch having a round first compartment 210 for holding the food article and a generally semi-circular second compartment 212 for holding the juices formed from heating the food article.

FIG. 30 shows a dove tail tamper proof seam 200 as a cross sectional view along lines 32—32 of FIG. 32 showing a plan view of a plastic cooking pouch 202. As shown in FIG. 30 in Step A, a first plastic sheet or film 204 is formed in the shape of a cavity or indentation 205 and a second sheet 206 is overlaid over the first sheet 204 so that a projection 207 formed in the second sheet 206 extends into the cavity 205. Pressure and suction forces are applied to the first sheet 204 and second sheet 206 in Step B wherein the projection 207 of the second sheet 206 expands into form fitting cooperative engagement with the cavity 205 of the first sheet 204 thereby forming a dove tail tamper proof seal 208 as shown in FIG. 31.

As shown in FIGS. 32–35, the plastic cooking pouch 202 is formed from the preformed first sheet 204 molded into a container and with a second sheet 206 removably sealed to the second sheet 204 as a cover. The second sheet is also formed having a first compartment 210 for containing a food article and a second compartment 212 for holding liquid formed upon heating the food article. The first compartment 210 and second compartment 212 are separated by a thin wall 214 as shown in FIGS. 32–33 or a thick wall 214 as shown in FIGS. 34–35, each having a lower portion forming a passage or channel 216 therein between at the upper edge for transfer of liquid between the first and second compartments, 210 and 212 respectively. The second sheet 206 may be removed after heating the food article, by holding the pouch 202 at an angle peeling it away from the outer edge toward the second compartment 212. This causes the meat juices to flow from the first compartment 210 into the second compartment 212. While the food article is being removed the juices will be trapped inside the second compartment 212. Of course, the pouch 202 may be tilted to drain the juices into the second compartment 212 before peeling back the second sheet 206.

Figure 36:
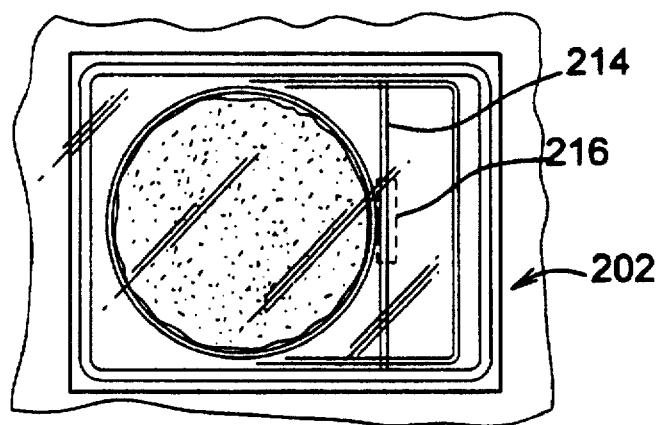
FIG. 36 is top plan view showing another embodiment of a plastic cooking and hot staging pouch showing the wall having perforations therethrough at selected positions for transfer of the fluid between the first compartment and second compartment.
Figure 37:
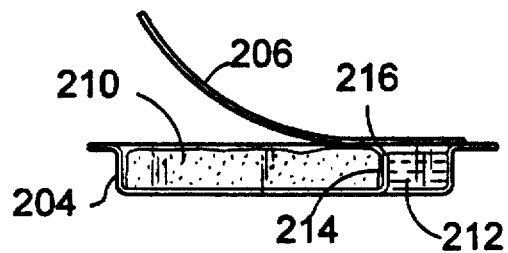
FIG. 37 is a side view of FIG. 36.

FIGS. 36–37 show another embodiment of a plastic cooking and hot staging pouch showing the wall 214 having perforations therethrough at selected positions for transfer of the fluid between the first compartment 210 and second compartment 212.

Figure 38:
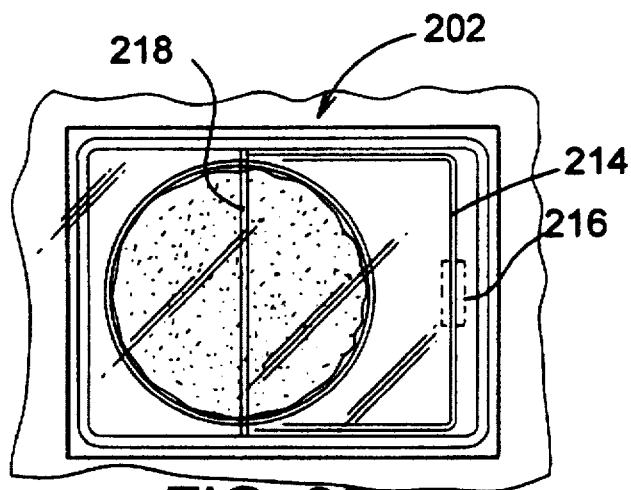
FIG. 38 is a top plan view showing another embodiment of a plastic cooking and hot staging pouch showing the second sheet having a living hinge formed about midway of the first compartment.
Figure 39:
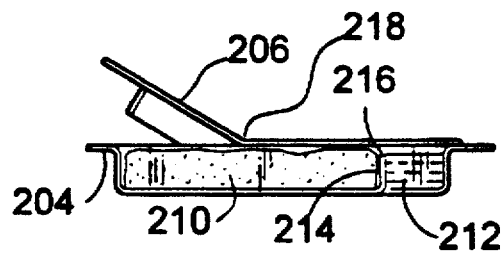
FIG. 39 is a side view of FIG. 38.
Figure 40:
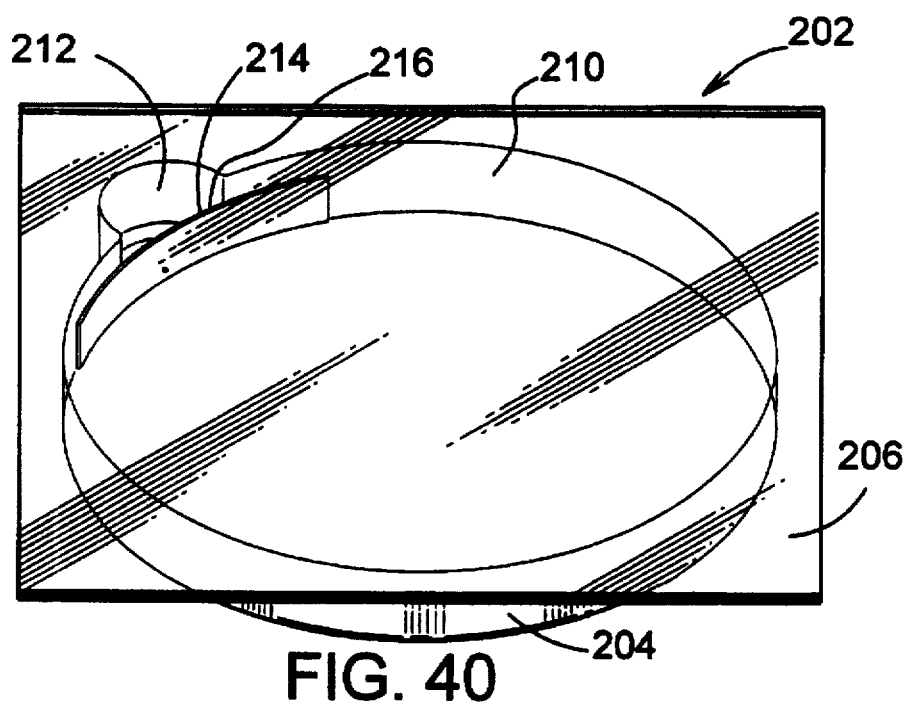
FIG. 40 is a perspective view of a plastic pouch for cooking and staging having a round first compartment of holding the food article.
Figure 41:
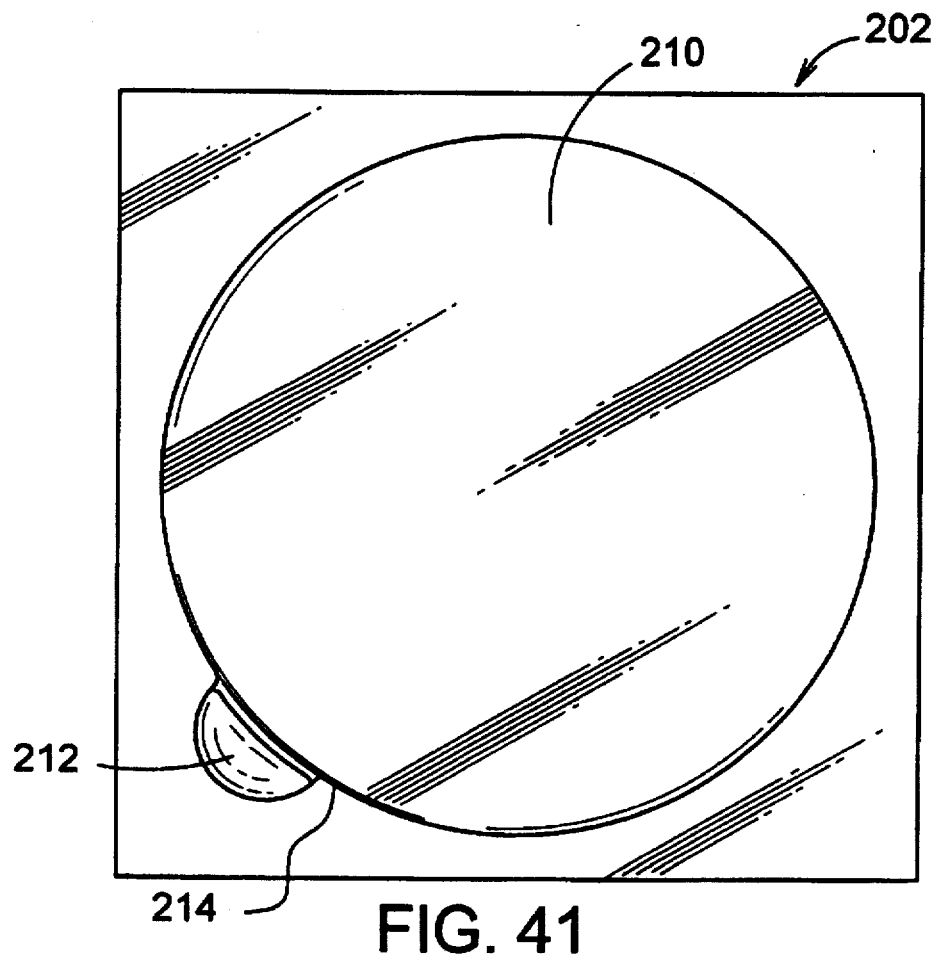
FIG. 41 is a inverted bottom view of FIG. 40.
Figure 42:
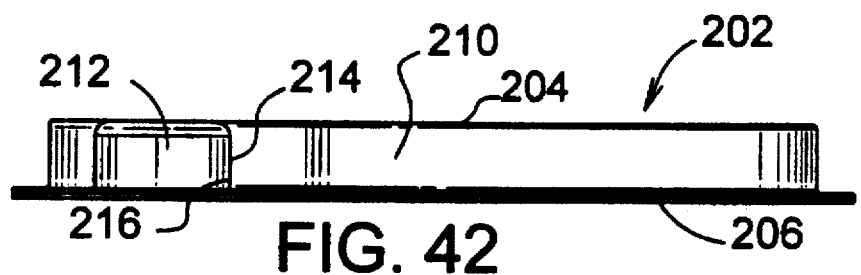
FIG. 42 is a rear view of FIG. 40.
Figure 45:
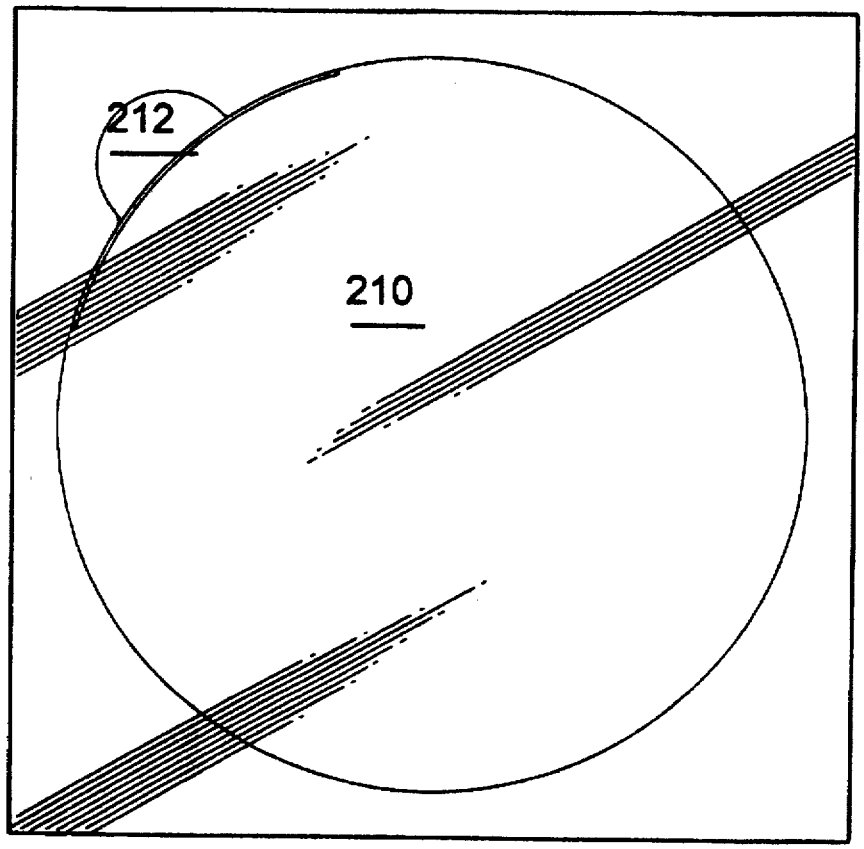
FIG. 45 is a top plan view of FIG. 40.
Figure 44:
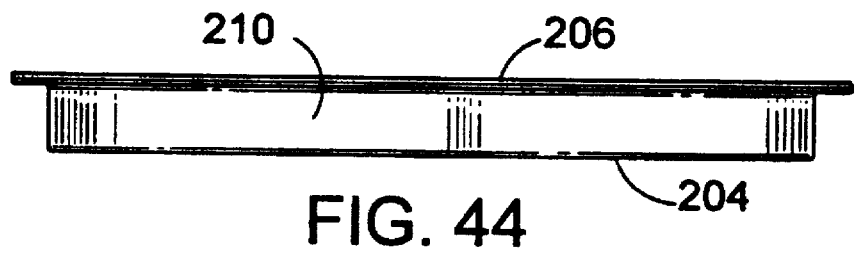
FIG. 44 is a front view of FIG. 40.
Figure 43:
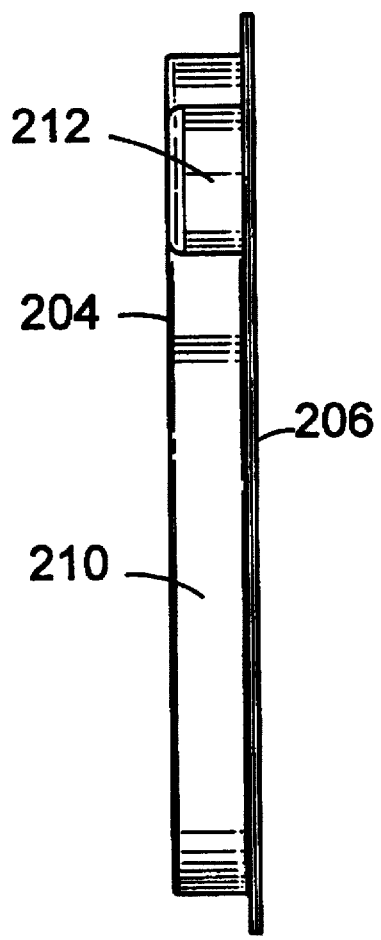
FIG. 43 is a left side view of FIG. 40.
Figure 46:
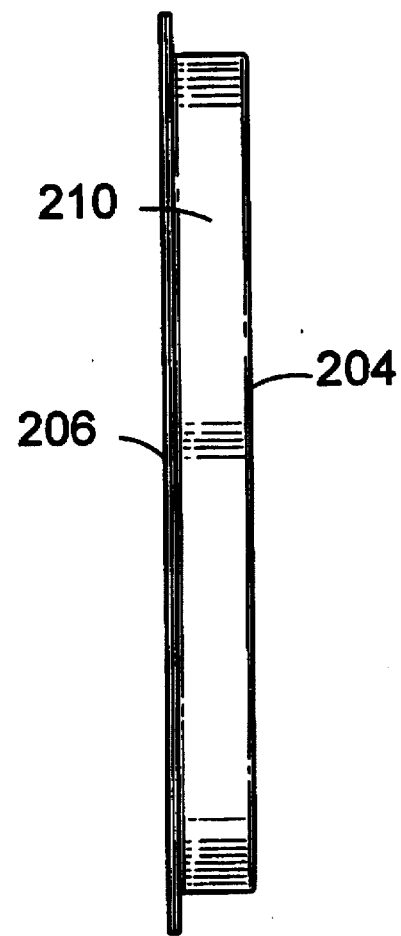
FIG. 46 is a right side view of FIG. 40.

FIGS. 38–39 show another embodiment of a plastic cooking and hot staging pouch showing the wall 214 having perforations therethrough at selected positions for transfer of the fluid between the first compartment 210 and second compartment 212. The second sheet 206 is shown having a living hinge 218 formed about midway of the first compartment 210 for easy access to the food article. Moveover, about 15 to about 17% meat juices and about 6% to about 8% fat juices are formed from a ¼ pound hamburger patty formulated to be an 80:20 percent meat to fat ratio; therefor; a dry gravy powder is contained in the liquid reservoir so a gravy is formed upon shaking the pouch and mixing the powder and juices before serving.

Figure 47:
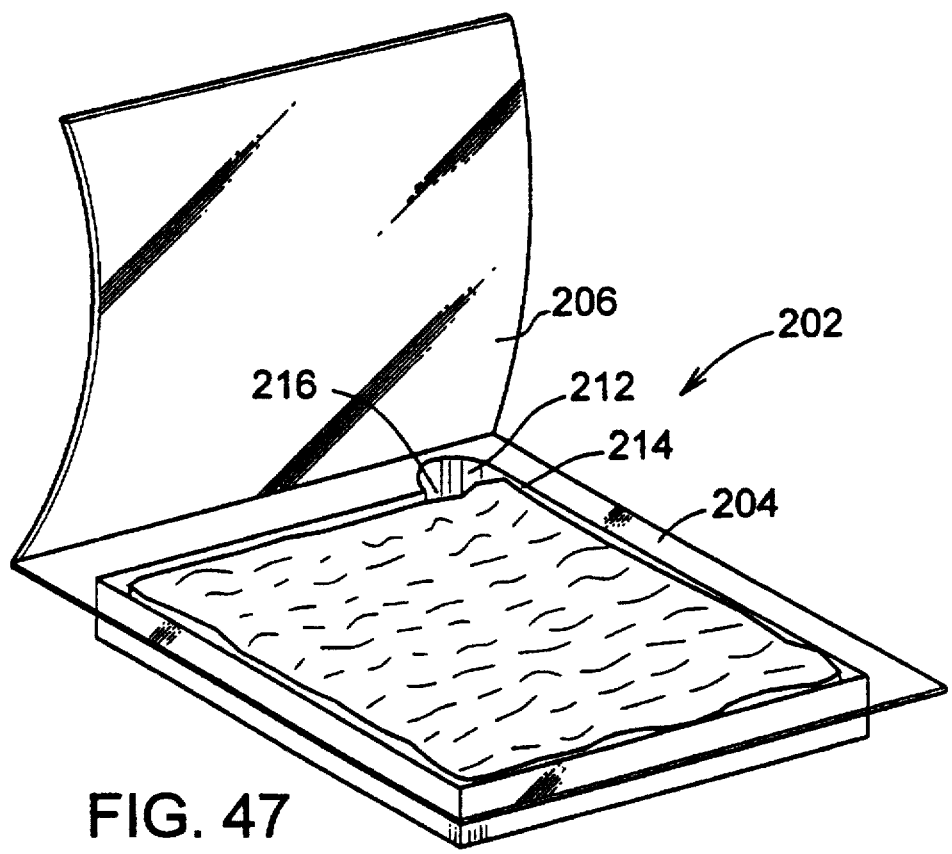
FIG. 47 is a perspective view of a plastic pouch for cooking and staging having a square first compartment of holding the food article.

FIGS. 40–46 show a plastic pouch having a round first compartment 210 for holding the food article and a generally semi-circular second compartment 212 for holding the juices formed from heating the food article. FIG. 47 shows a plastic pouch having a square first compartment 210 for holding the food article and a generally semi-circular second compartment 212 for holding the juices formed from heating the food article.

Figure 49:
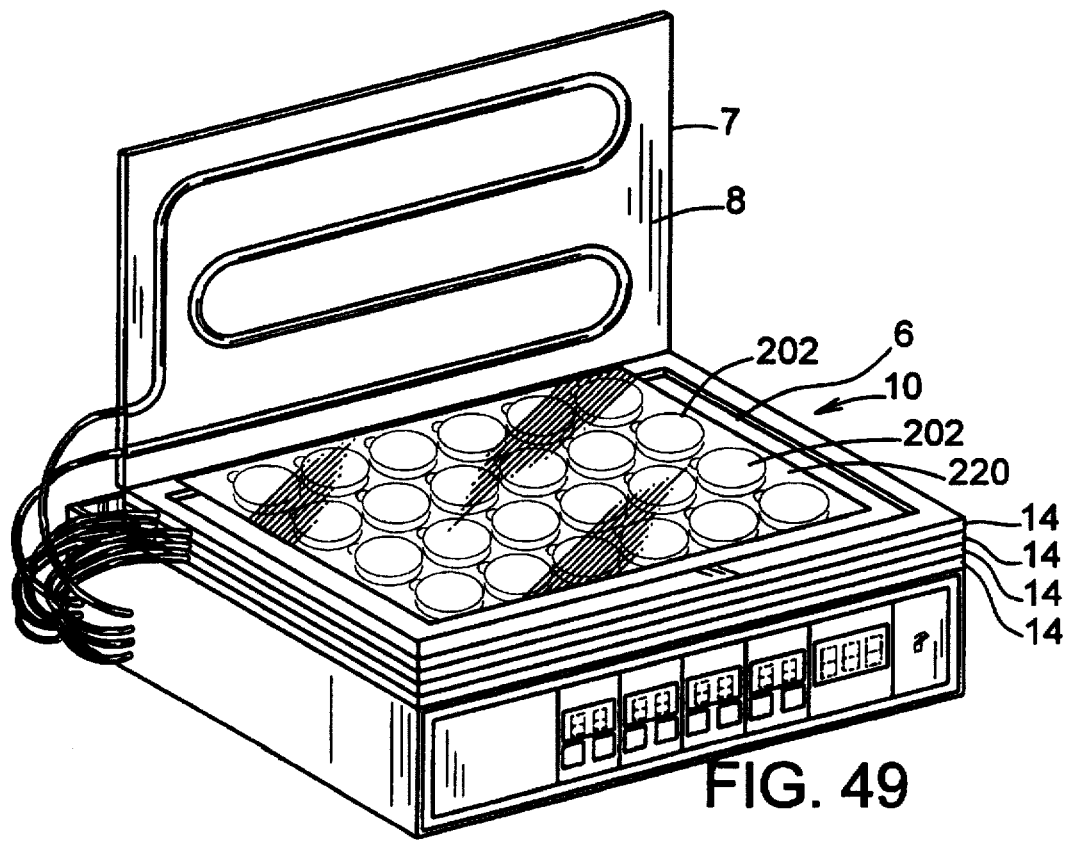
FIG. 49 is a perspective view showing a sheet of round plastic pouches containing food articles being grilled in the present invention.
Figure 48:
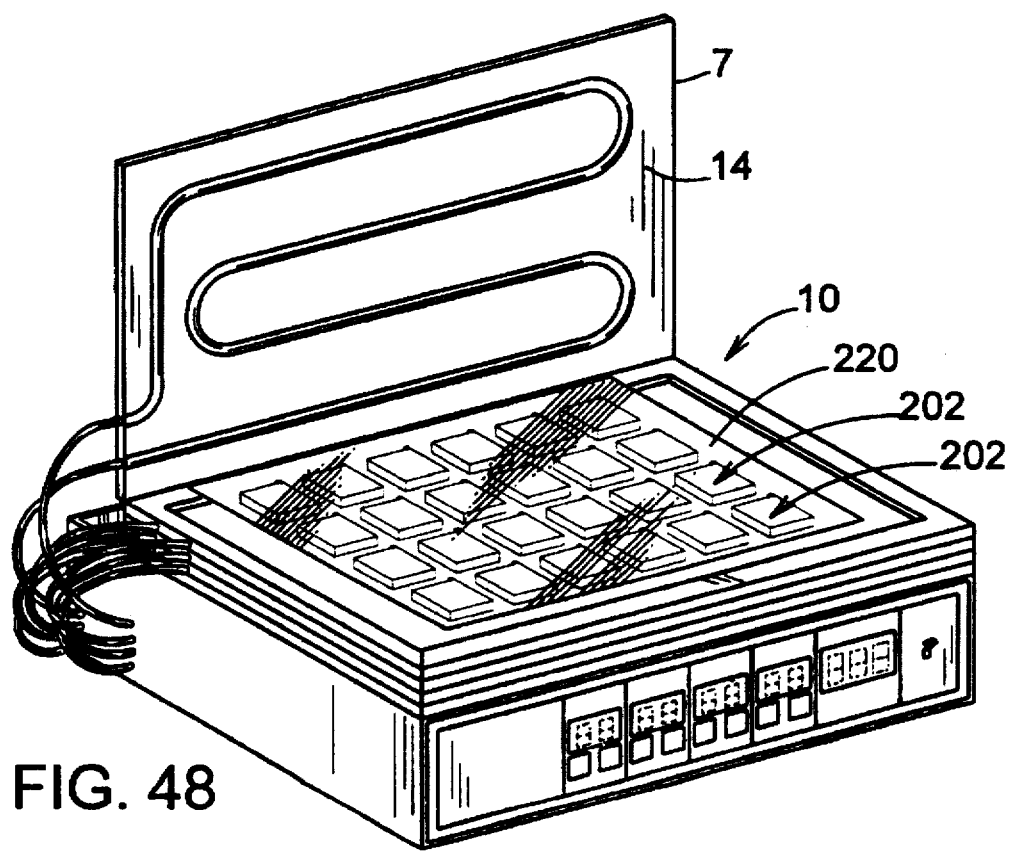
FIG. 48 is a perspective view showing a sheet of square plastic pouches containing food articles being grilled in the present invention.
Figure 50:
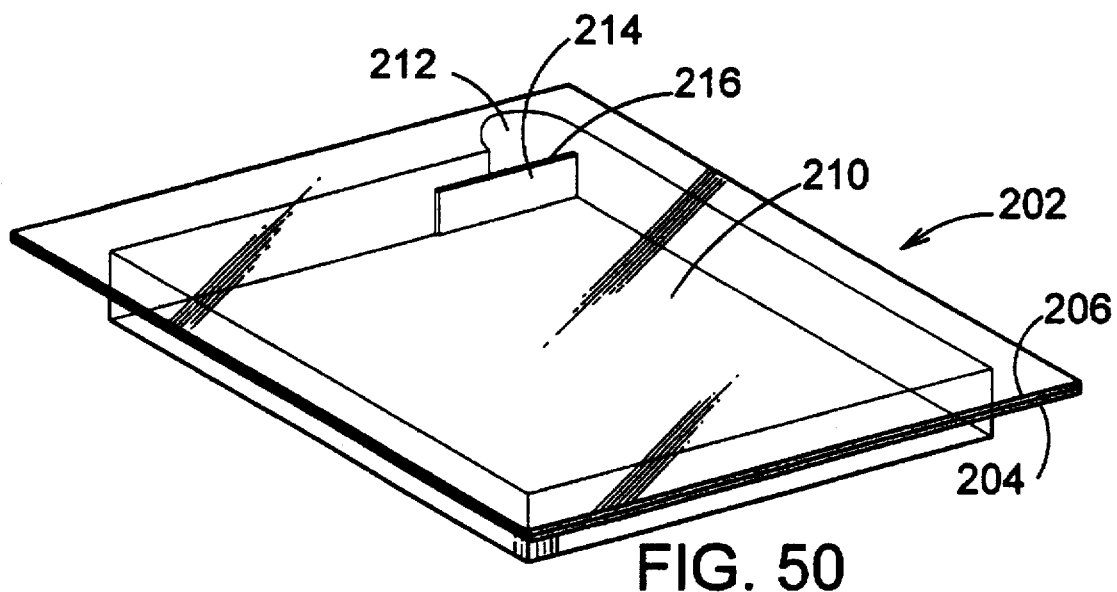
FIG. 50 is a perspective view showing a square plastic pouch for cooking and staging having a square first compartment of holding the food article.
Figure 51:
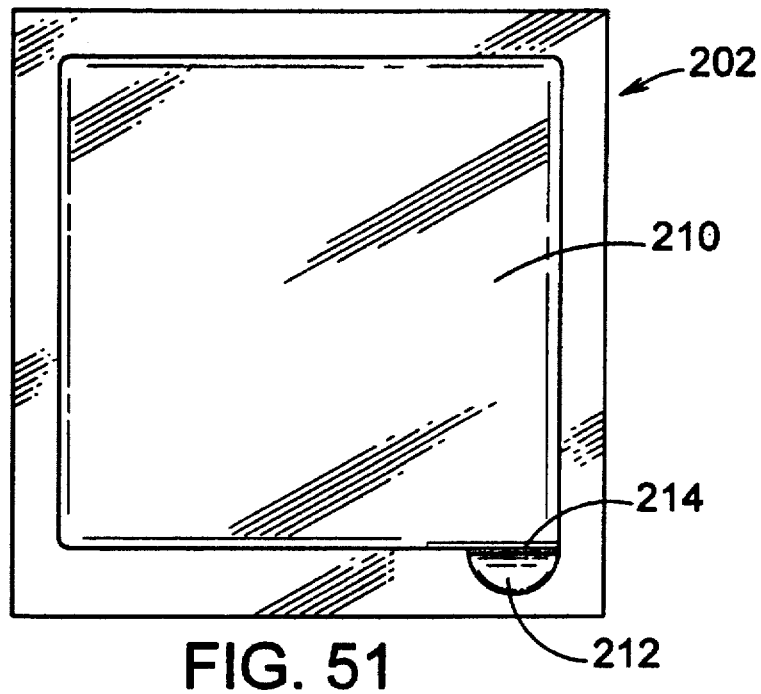
FIG. 51 is a inverted bottom view of FIG. 50.
Figure 52:
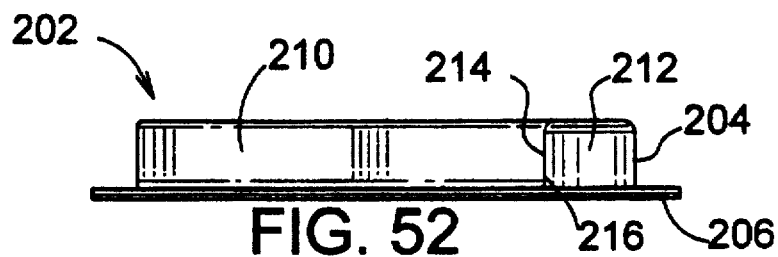
FIG. 52 is a rear view of FIG. 50.
Figures 53, 54, 55:
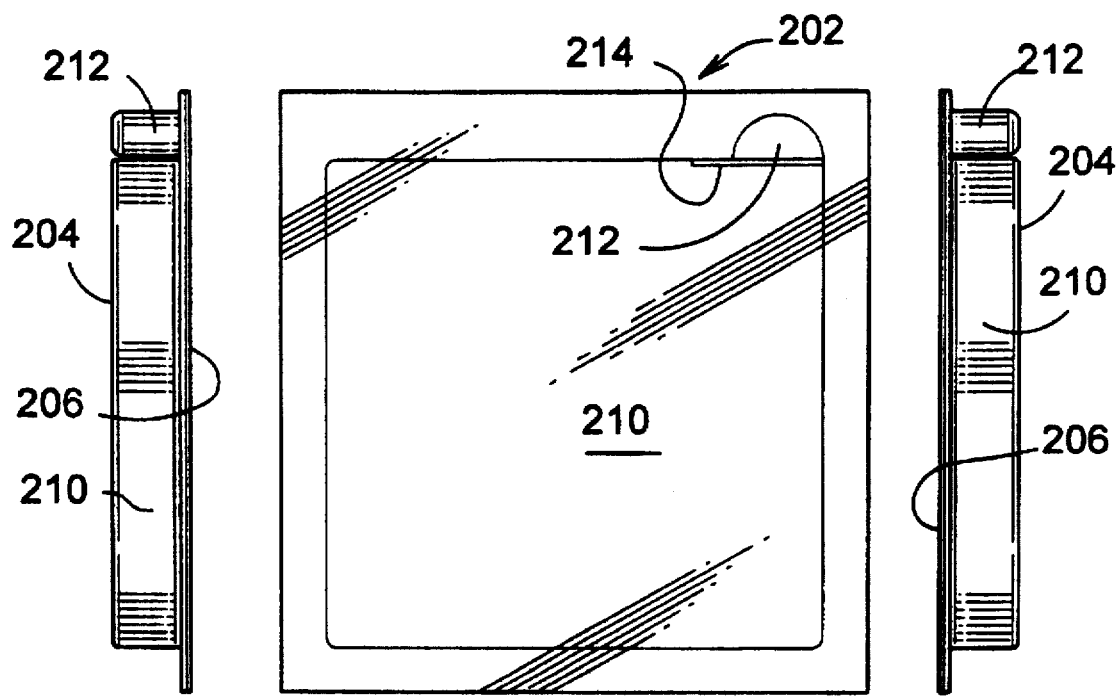
FIG. 53 is a left side view of FIG. 50.
FIG. 54 is a top plan view of FIG. 50.
FIG. 55 is a right side view of FIG. 50.
Figure 56:
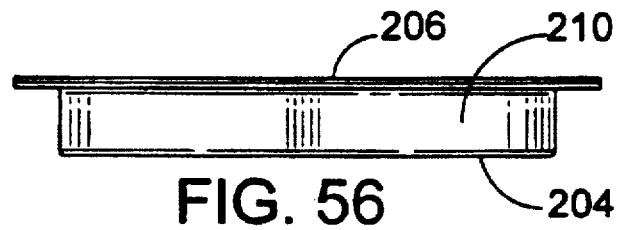
FIG. 56 is a front view of FIG. 50.
Figure 57:
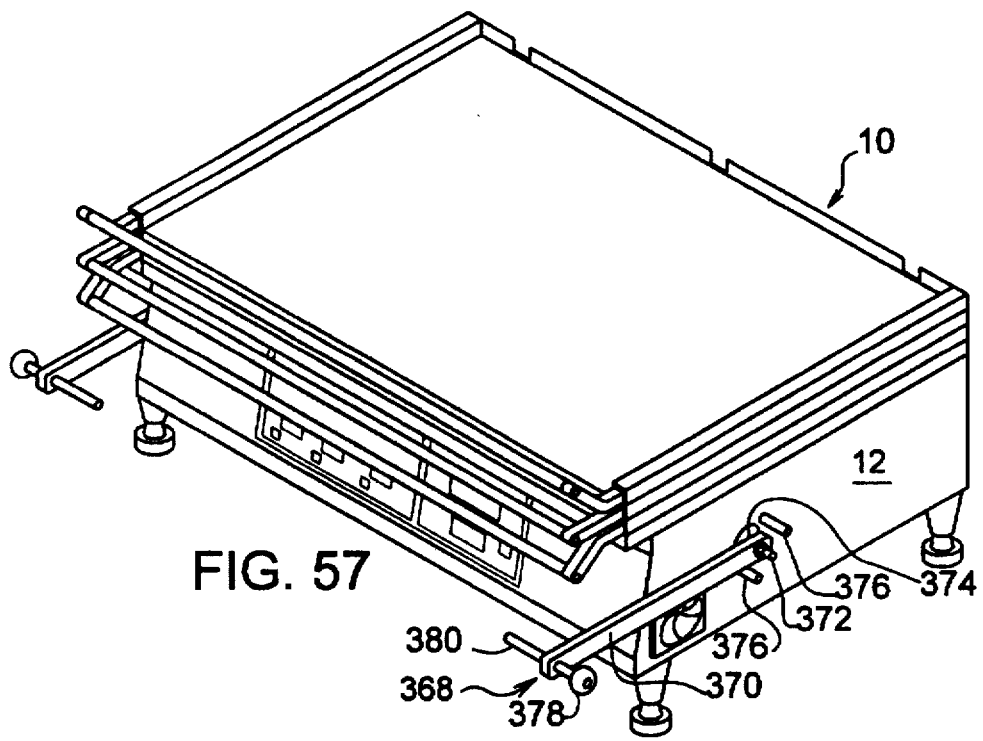
FIG. 57 is a perspective view of a multi-plate grill showing the stacked plates thereon.

As shown in FIGS. 48–49, a plurality of individual pouches 202 may be formed together in a sheet 220 for use in the present invention.

FIGS. 50–56 show a plastic pouch having a square first compartment 210 for holding the food article and a generally semi-circular second compartment 212 for holding the juices formed from heating the food article.

The floating hinge 54 of the present cooking and staging grill 10 provides an novel spacing and alignment means. The plates 5, 7, 14 are hingeably engageble or disengagable from contact with the food product and are spaced apart a selected equal-distance from one another in the "in-use" horizontal configuration. In the preferred embodiment, the top cover plate 7, and intermediate plates 14 supporting the thermalized heat conducting containers having food articles 13 therein are mounted by mechanical floating hinge means 54 which engages and disengages the horizontal plates 14. A simple type of floating hinge 54 is shown in FIG. 12. A more versatile type of hinge means is described in detail in Applicant's copending application Ser. No. 08/673,925 filed in the U.S. Patent Office on Jul. 1, 1996 and is hereby incorporated by reference and explained in more detail hereafter.

The term "floating hinge" defines a hinge 54 designed to pivot so that the front end, sides, and back end of the plates 7, 14 are positioned in the horizontal plane and spaced apart equal distance and parallel with respect to one another when stacked one above the other in the "in-use" position for holding and heating food articles 13 thereinbetween. More particularly, floating lever hinges 54 support or attach to the side or at least one end of the top cover plate 7 and each of the intermediate plates 14, or plate holding frames 15, 17 and the housing 12, wherein the floating hinge means 54 define a pair of longitudinal members such as tubular members or solid rods which are removably attached to the side edges of the plates 14 by a friction fit or other means of holding. The floating hinge means 54 enables the plates 7, 14 to be perpendicularly opened and realigned in precise horizontal condition relative to each other. The floating hinge arrangement provides maximum heat transfer from the plates 7, 14 to the food articles 13 via conduction and radiation heat transfer from the bottom of the first top sheet 46 as well as from the top of the bottom sheet 48 of the grill plates 7, 14. Moreover, convective currents formed by moisture present in the vapors and juices existing in and around the interstices of the food product with the heat conducting container also serves to enhance the heat transfer of BTU's in combination with the conduction and radiant heat imparted to the food articles 13 from the plates 5, 7, 14 by conduction to the respective food article 13 and convection of moisture formed by juices within the food article 13. Typically the food articles 13 are meat products such as hamburger, turkey, pork, or chicken meat patties or any other viable food articles 13 including vegetables, carbohydrates, and farinaceous products. A spring means 56, such as a torsion spring may be utilized to bias the top cover plate 7 and any intermediate plates 14 in the open "up" position. The locking latch or fastening means 58 may be utilized to removably secure each of the plates 7, 14 to the housing 12 or base 26 or one another in the open "up" position or in the closed "down" position during the heating cycle. Preferably, the latches 58 are in electrical communication with the control and alarm system 24 and controlled with a Watlow Process Controller and Digital Monitor or equivalent computerized controller and alarm system 24.

The grill plates 5, 7, 14 can be configured to permit a variety of loading depths (i.e., the distance between the underside or bottom heating surface 8 of the upper grill plate 7, 14 and the top heating surface 6 of the lower grill plate 5, 14. When operational needs call for a horizontally oriented closing function, the use of specially designed, floating hinges 54 girdling the entire periphery of the plate and its raised side walls, allow the plates 7, 14 to be lifted from its closed position by ⅛" up to 4" in the basic configuration, or even higher when specific purposes necessitate a greater loading depth. This flexibility in dimensional heights, achieved through various, operationally specific design modifications, allows for accommodations to meet the most efficient conductive thermalization (i.e., heat transfer) dynamic as related to the average cross-sectional dimensions of any specific food product unit.

It should be noted and is hereby emphasized that all excess fat and oil fluids, extracted during the conductive and convective thermalization and staging processes, do not constitute any volatile fat particles capable of leading to environmental pollution, since the oil and fat extraction, as well as their subsequent evacuation, occur at temperatures never higher than 205° F. and, therefore, always well below the boiling point of water. Engineering the multiplicity of grill plates 14 within the clamshell grill 10 so as to permit them, in their closed, horizontal orientation, to be tilted backward at an angle sufficient to cause all evacuated oil fluids to flow toward the rear of the heat conducting containers sealing the food articles 13 so that the fatty juices may be separated from the product and drained from the heat conducting container, or depending upon the product the fat or other liquids may be saved to provide juice or sauce for the food articles 13. Consequently, the end product is lower in overall fat content (and, hence, more desirable to most consumers) than one not subjected to this unique staging process.

As shown in FIGS. 57–67, the low temperature cooking and staging grill 10 includes a novel floating hinge apparatus 312 comprising a plate support arm member 314, at least one pair of floating hinge blocks 316, and a support rod 318 therefore. Preferably the floating hinge blocks 316 are composed of nylon, teflon, of some other synthetic polymer such as DELRON™ providing a minimum friction coefficient between the alignment hinge block 316 bearing the plate support arm member 314. It is contemplated that the floating hinge blocks 316, support rod 318, and/or support arm member 314 may also be composed of metal or synthetic material. The hinge block 316 of each floating hinge set 324 is generally square or rectangular in shape, however, it can be formed in any shape to support the plate support arm member 314 and support pivot rod 318 extending therethrough. The plate arm support member 314 may be a rod, tube, strip, or other such longitudinal member.

Figure 59:
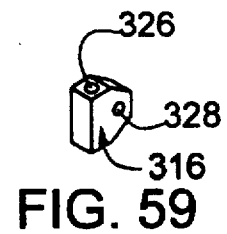
FIG. 59 is an enlarged perspective view of a hinge block in accordance with the present invention.
Figure 60:
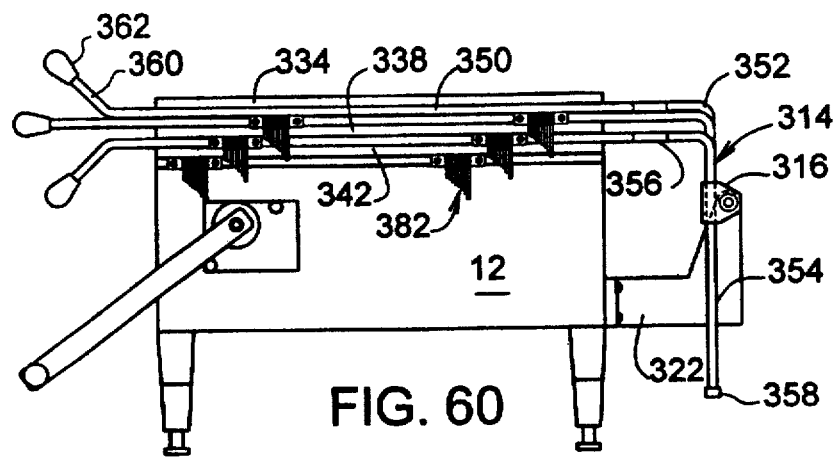
FIG. 60 is a side view of the multi-plate grill and floating hinge also showing spacer means in the resting position.
Figure 61:
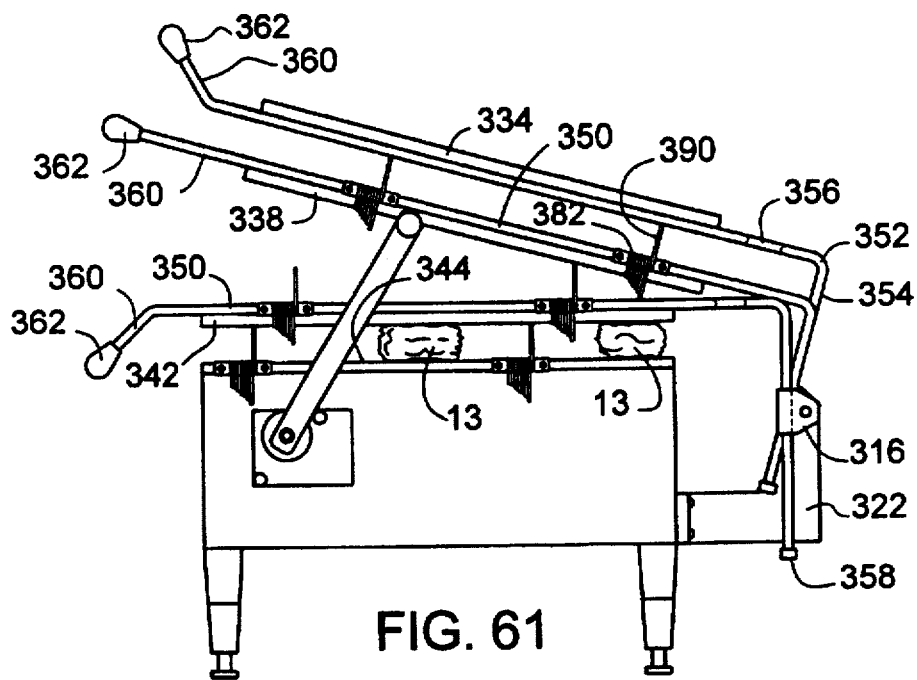
FIG. 61 is a side view of the multi-plate grill and floating hinge invention of FIG. 59, showing the top plate supported by the spacer means and showing the hinge mechanism moving the plates up and back to maintain the plates in equal distance alignment in the horizontal plane regardless of the spacing thereinbetween.
Figure 62:
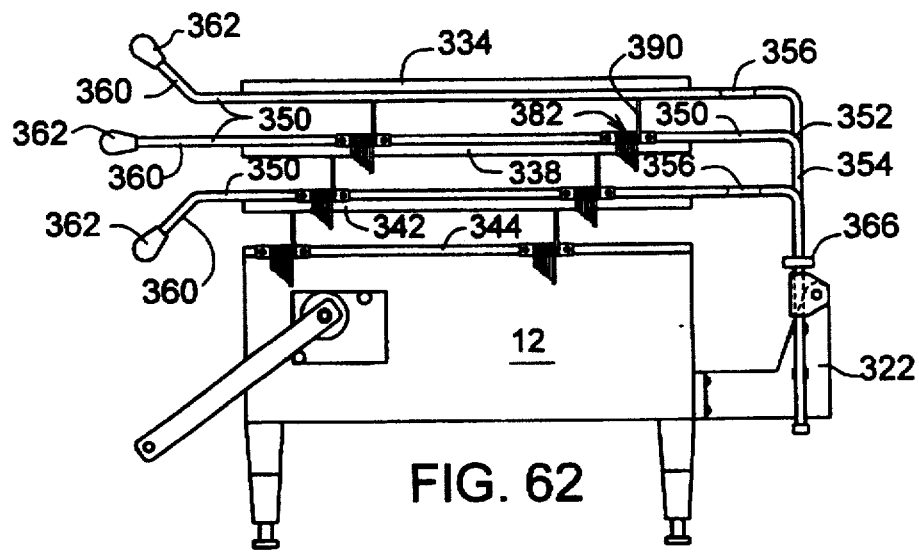
FIG. 62 is a side view of the multi-plate grill and floating hinge assembly showing all of the plates spaced apart equal distance and in alignment with one another showing food articles thereinbetween.

The floating hinge apparatus 312 comprises a multiple-hinged, flotation and horizontally parallel-tilting mechanism to align a multitude of perpendicularly staggered plates 320 in precise horizontal alignments with selectable height distances relative to each to other. The adjustable hinge apparatus 312 is provided for use with a grill 10 having a top plate 7 and stacked intermediate heating plates 14. A horizontal support pivot rod 318 extends from one side of the grill, preferably the rear side, to form a common pivot axis. A pair of mounting brackets 322 having at means for supporting the support pivot rod 318, such as a hole in the horizontal axis, extend outwardly away from the grill 10 spaced apart and in alignment with one another to support the support pivot rod 318 extending thereto, or therethrough. Of course, it is contemplated that a each side of the housing 12 could utilize a pair of support brackets 322 having a short support rod extending thereinbetween for pivoting support therearound. The floating hinge apparatus 312 comprises an array of hinge blocks 316 forming a hinge block set 324 on each side of the grill 10, whereby a plurality of hinge blocks 316 are positioned adjacent one another on the support rod 318. As best illustrated in FIG. 59, each floating hinge apparatus 312 includes a hinge block 316 having a pivot aperture 326 generally positioned in the horizontal axis in alignment with the pivoting side of the grill 10 sized for pivoting or rotating movement of the horizontal support pivot rod 318 extending therethrough. Each floating hinge block 316 also includes a slide aperture 328 generally positioned in the vertical axis and generally normal to the pivot aperture 326, wherein the slide aperture 328 provides a means for sliding movement of a plate support arm member 314 extending therethrough. The plate support arms 314 of adjacent hinges 316 are formed for attachment with consecutively stacked heating plates 7, 14 and the hinge block 316 of each hinge block set 324 is formed to pivot or rotate on the support pivot rod 318 perpendicular to the pivot axis and independently of adjacent hinge blocks 316. The adjustable hinge apparatus 312 of the present invention allows the heating plates 7, 14 to self-adjust relative to one another to accommodate various thickness of food articles 13 between two sets of plates 7, 14 and provide means for pivoting the stacked heating plates 7, 14 simultaneously about a common pivot axis.

In the preferred embodiment, two floating hinge block sets 324 comprise a pair of floating hinge blocks 316 situated on opposite ends of a horizontal support pivot rod 318 in spaced-apart relation to one another. Each floating hinge set 324 includes a plurality of adjustable hinge blocks 316, three are shown in the drawings, positioned in mirror-image orientation relative to one another. The floating hinge block sets 324 include a pair of inner hinge blocks 332 formed for attachment to a top plate 334, a pair of center hinge blocks 336 formed for attachment to a middle plate 338, and a pair of outer hinge blocks 340 formed for attachment with a lower plate 342 spaced apart from the top heating surface 344 of the grill housing 12.

The floating hinge blocks 316 of each hinge block set 324 are held in side-by-side orientation and prevented from sliding on the support rod parallel to the pivot axis by retaining means 348 such as bushings, retainer rings, pins, or clip and groove arrangements, which promote the independent sliding of the floating hinge blocks 316 relative to one another and permit the floating hinge blocks 316 to tilt to an ajar orientation to accommodate various thickness of food articles 13 between the plates 320.

As shown in the preferred embodiment in FIGS. 58, and 60–64, the plate arm support member 14 comprises a first end defining a horizontal section 350 for attaching to and supporting a plate 320, a center section 352 bent downward at about a ninety (90) degree angle so that a portion of the plate support arm member supporting the plate is oriented in the horizontal plane and the portion in slidable engagement with the hinge block 316 is oriented in the vertical plane comprising a second end defining a vertical section 354. The plate support arm member 14 is slidably received within the slide aperture 328 whereby the vertical section of the plate support arm member 354 extending downward in the vertical direction through the slide aperture 328 may be adjusted so that the horizontal portion 350 of the plate support arm member 314 may be aligned with the height of the heating plate 320 in the horizontal plane. As shown best in FIGS. 58 and 63, selected plate support arm members 314 include an offset region 356, before, at, or after the vertical bend of the center section 352 forming a "S" curve, whereby selected plate support arm members 314 are offset at an angle in the horizontal or vertical plane to permit multiple hinge blocks 316 to pivot in a side-by-side fashion about the support pivot rod 318 and provide a means for stacking multiple plate support arm members 314 and plates 320. The plate support arm members 14 may optionally include a weight or counterbalance 358 on the distal end of the vertical section 354. The distal end section 360 of the plate arm support members 314 may be straight as shown for the middle plate 338, or curved upward as shown with plate 334, or curved downward as shown by plate 342. It is contemplated that the distal end section 360 may also be curved inwardly or outwardly for easy recognition and holding. Moreover, a knob 362 may be attached to the distal end of each plate support member 314 and/or a cross member 364 may connect the knobs 362 or distal end sections 360 of the two aligned plate support arm members 314 support any one plate 320.

Figure 58:
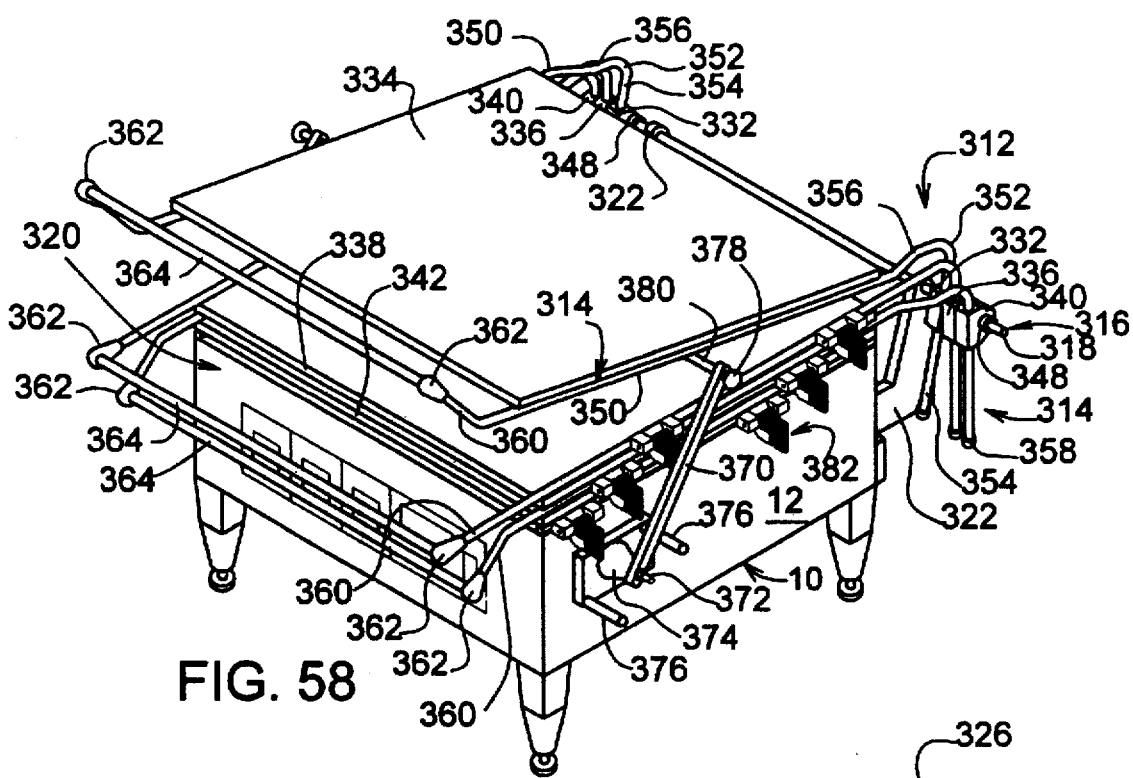
FIG. 58 is a perspective view of a multi-plate grill showing the floating hinge of the present invention having one of the plates elevated and supported in the "up" fill position for receiving food articles.
Figure 63:
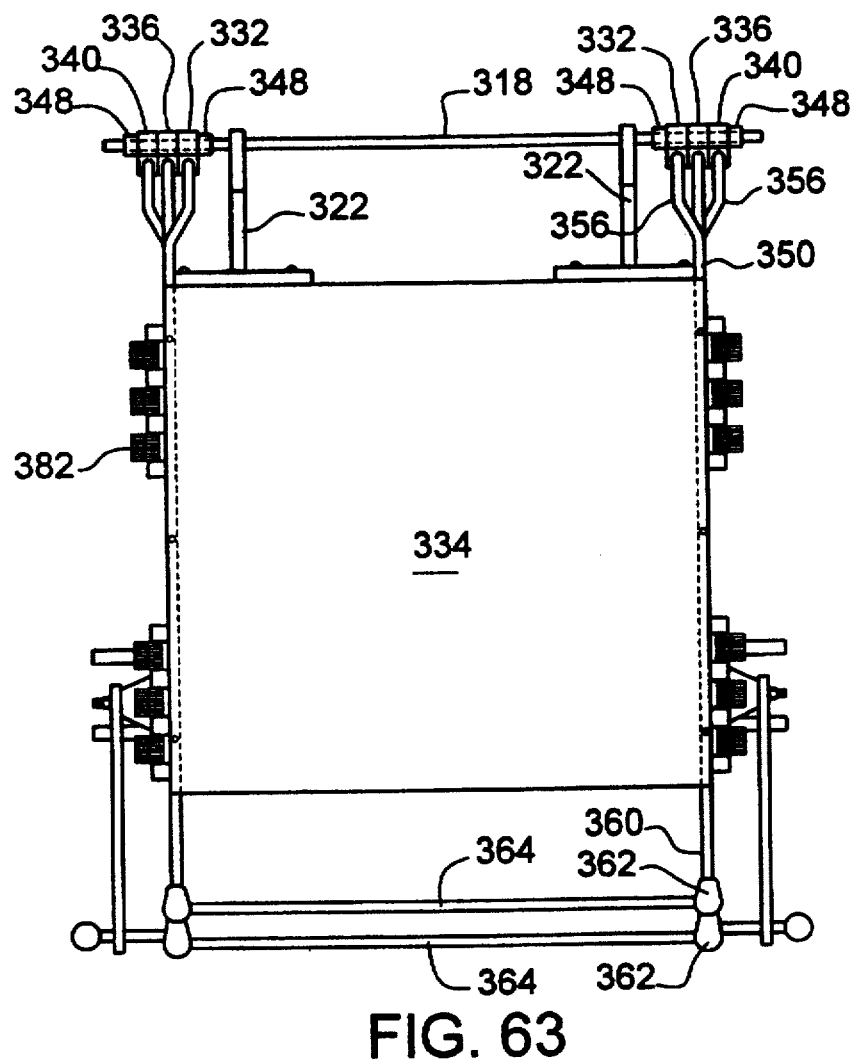
FIG. 63 is a top view of the multi-plate grill showing the offset arrangement of floating hinge supported by a single horizontal support rod member and the spacers attached to the sides of the plates.
Figure 64:
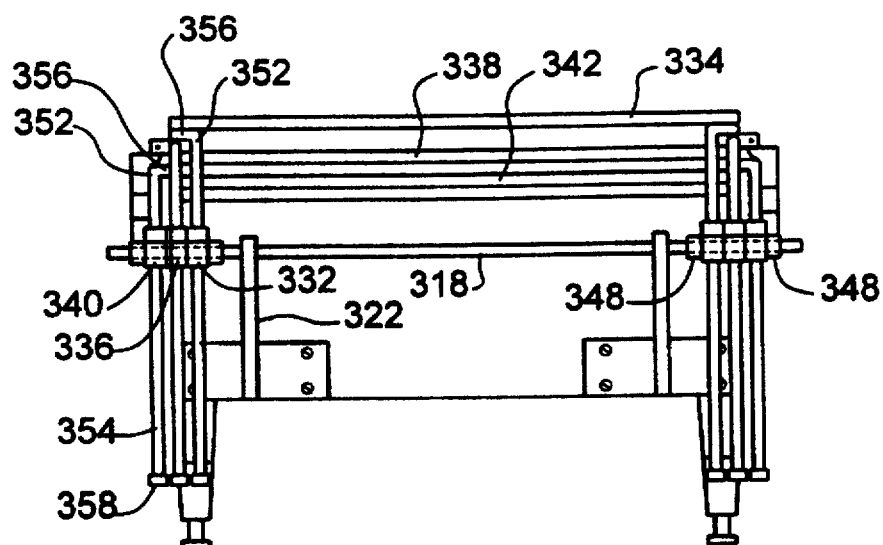
FIG. 64 is a rear view of the multi-plate grill showing the offset arrangement of the floating hinge support members supported by a single support rod member.
Figure 65:
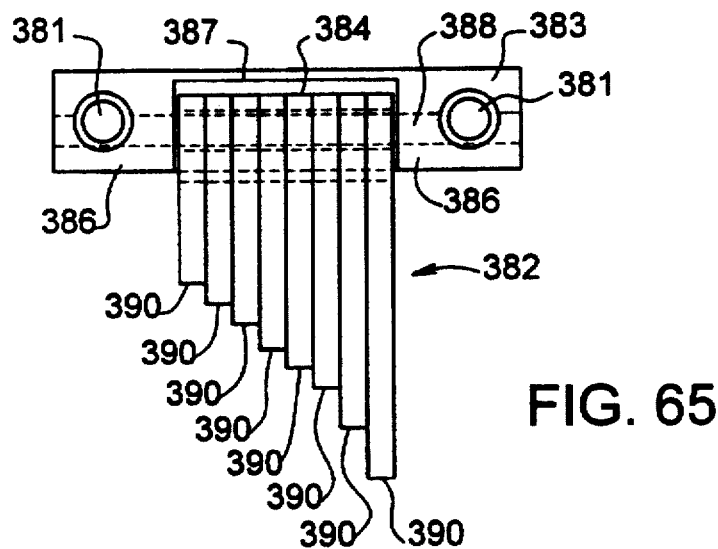
FIG. 65 is a front view of a spacer used in combination with the floating hinge assembly to maintain the equal distance of the plates in the horizontal "in-use" position.

As illustrated in FIGS. 58, 63–64, the preferred embodiment shows that the support pivot rod 318 extends through the pivot aperture 326. Because the plate support arm members 314 are held to the sides of the plates 320, the width of the plates 320 determine the spatial distance between the floating hinge block sets 324. However, the plate support arm members 314 may be attached to the plates 320 by other means such as by a tongue and groove arrangement; therefore, a retaining means 348 for holding the hinge block sets 324 in the desired position on the support pivot rod 318 may also be utilized. As shown in the preferred embodiment the retaining means is not always necessary. Likewise, arm retaining means 366 positioned on the vertical section 354 of the plate support members 314 may be used to hold the vertical portion of the plate support arm members 314 at a selected position with respect to the slide aperture 328 in order to maintain a predetermined spacing between the plates 320. Of course the sliding relationship between the plate support arm member 314 and the slide aperture 328 may provide sufficient support via a friction fit which tends to hold the plate support arm member 314 at the desired position upon pivoting the plate 320 and plate support arm members 314.

The floating hinge apparatus 312 allows the plates of a multi-plate heating grill 10 to be hinged individually and to pivot as individually or as one when accessing other than the top plate 334. The united pivoting movement prevents any relative horizontal movement between the plates 320 which would distort and damage the food articles 330 held therein between. The ability of the plates 320 to move vertically with respect to each other allows the user to simultaneously heat various products which may be of different thicknesses. The floating hinge apparatus 312 also provides a means to tilt to ajar orientations in order to maintain and optimize the conduction heat transfer between the surface of the food articles 330 to be heated and the heating surfaces of the plates 320.

The floating hinge apparatus 312 of the instant invention provides a means for variable spacing between the plates 320, permits free floating vertical movement between the plates 320, and prevents relative horizontal movement between the plates 320 by maintaining a common pivot point for all of the plates 320 regardless of the position.

The length of the central section or bend 352 of the plate support arm member 314 is determined by bending the are member 314 to conform with the level of the multi-deck, horizontally staggered plate floating at a 90 degree angle, for one, two, three, four, five or more vertically tilting plates 320. In the preferred embodiment the spaces between the plates 320 are at least ⅛" apart, in order to accommodate the ⅛" round rod tilting requirements; however, the spacing may be less according to the selection of the materials of construction for the plate support arm members 314 and the means of attachment to the plates 320. The hinge block sets 324 form an interdependent, multi-component hinge tilting and horizontally aligning mechanism providing a means to obtain precisely replicable alignments of the plate(s) 320 positioned to maintain constant relative alignment in either horizontal or any other angular position of up to 35 to 40 degrees or as great as 85 degrees from its respective tilting axis.

As shown in FIGS. 57–58, and 60–64, a pivoting plate and plate support arm holding assembly 368, "pivoting arm holding assembly". The pivoting arm holding assembly 368 consists of a lever 370 connected to the sides of the grill housing 346 by an attachment means, such as a bolt 372. A spacer means 374 of a selected thickness is positioned between the lever 370 and housing 346 depending on the width of the plates 320 as compared to the housing 346. A pair of stop means such as pegs 376 extend outwardly from the housing 346 a selected distance to limit the movement of the lever 370. A handle 378 having a longitudinal member 380 extending inwardly a selected distance is attached perpendicular to the distal end of the lever 370. The pivoting arm holding assembly 368 is pivoted backward so that the when the plates 320 are pivoted, the lever 370 is pivoted backward so that the longitudinal member 380 of the lever 370 is supported by the pegs 376 providing a means of support for the bottom of the plates 320 when the plates 320 are pivoted upward in the open position. When the plates 320 are in the horizontal resting position, the lever 370 pivots downwardly in front of the housing 346.

As illustrated in FIGS. 58, and 60–67, each plate 320 is provided with a spacer means 382. The multi-deck grill 10 utilizes shown in the preferred embodiment comprises at least two and preferably four sets of specially designed, variable-height spacer means removably attached to the sides of the plates 320 or plate support arm members 314; however, it is contemplated that a single, spacer means 382 could be utilized at the front of the plate 320 opposite the floating hinge apparatus 312.

The spacer means 382 of the preferred embodiment comprises a block of materials preferably composed of metal; however, synthetic polymers such as DELRON™, nylon, or teflon would also be feasible. The preferred embodiment of the spacer means 382 comprises a block 383 having a rear exterior surface 385 curved slightly for attachment to the side of a plate 320 or plate support member 314. The block 383 includes an interior cut-out portion 384 forming an angular, milled housing in between a pair of shoulders 386. In the preferred embodiment, a pair of attachment holes 381 are formed through the shoulders 386 along the horizontal axis for attachment to the side edge of a plate 320. A longitudinal member such as a metal pin 388 is supported between the shoulders 386. The cutout portion 384 of the block 383 has a flat bottom surface and side surfaces adjacent to the shoulders 386 thereof; however, the rear sidewall 387 of the cut out portion 384 extending parallel with the pin 388 is angled outwardly at an angle of about 60 degrees.

At least one, and preferably a plurality of distancing spacer members or blades 390, having a hole 392 near one end are pivotally connected to the block 383 by the pin 388 and nested therein adjoined to each other and capable of being moved selectively and individually on their swing axis along the holding pin 388.

Figure 66:
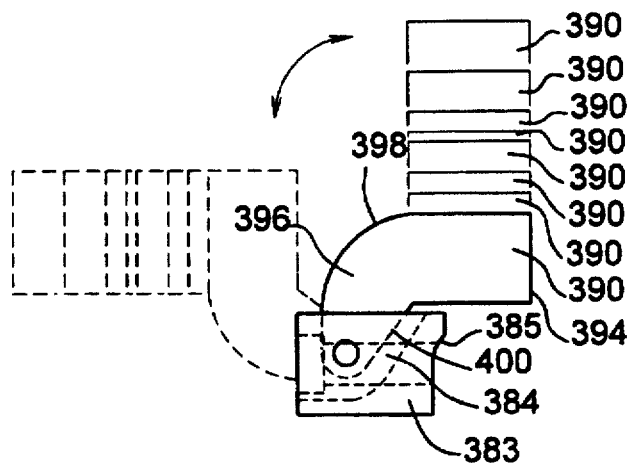
FIG. 66 is a rear view of a spacer showing the sequential movement of one of the spacer members.
Figure 67:
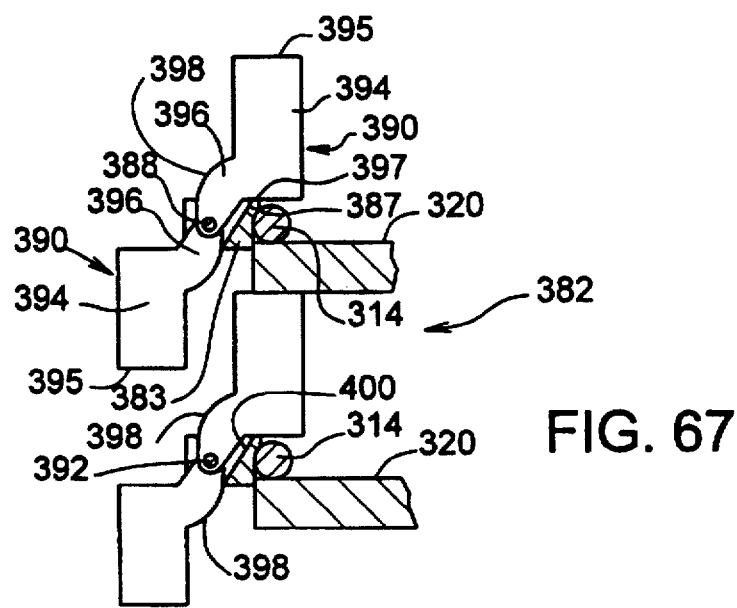
FIG. 67 is a partial sectional view showing a section of a plate and support means therefore supported by a single spacer member wherein the remaining spacer members remain in the resting position.

As shown best in FIGS. 66–67, each blade 390 is formed having a top portion 394 defining a flat top surface 395 for supporting the bottom of a plate 320 or plate arm support member 414. The top portion 394 is generally square or rectangular depending on the length or height thereof. The length of the top portion 394 for each blade 390 is formed in increments which are progressively longer in order to provide easily adjustable spacing between the plates 320 as shown best in FIGS. 58, 65, and 66. The top portion 394 joins a bottom portion 396 which is rectangular in the preferred embodiment, but may be formed in other convenient shapes. The preferred embodiment includes an arcuate or curved portion 398 which includes an edge 400 which may be shaped or angled for cooperative engagement with the cut out portion 384 of the block 383 as shown in FIG. 66. The bottom portion 396 includes a hole 392 therein for pivoting about the pin 388 and allows the blade 390 to pivot and the top portion 394 to disengage from the plate 320. The blades 390 are supported in the pivoted "up plate supporting" position whereby the bottom portion 397 of the top section 394 rests upon the lip 387 of the block 382.

The floating hinge apparatus 312 and spacer means 382 provides a means of forming infinitely selectable, parallel distance alignment between two or more plates 320, and maintaining the precise alignment of the plates 320 relative to each other during any tilting configuration ranging from a flat (0 degree angle) horizontal position up to about an eighty-five (85) degree angle, but generally up to about a 50 degree angle.

The foregoing detailed description is given primarily for clearness of understanding and no unnecessary limitations are to be understood therefrom, for modification will become obvious to those skilled in the art upon reading this disclosure and may be made upon departing from the spirit of the invention and scope of the appended claims.

I claim:

1. A low temperature clamshell cook and staging grill for transferring heat to food articles, comprising:

a housing frame;

a top cover plate having at least a bottom heating surface pivotally secured to said housing frame by a floating hinge and a bottom base plate having a top heating surface secured to said housing frame, said top cover plate and said base plate comprising a first sheet and a second sheet of heat transfer material bonded together having fluid heat transfer passages thereinbetween for recirculation of a heat transfer fluid;

means for connectively mounting said plates in hinged alignment with one another and to said housing;

a reservoir in fluid communication containing a heat transfer fluid in fluid communication with said top cover plate and said base plate;

means for heating said heat transfer fluid to a selected temperature in said reservoir;

means for sensing the temperature of said top cover plate and said base plate;

means for controlling the temperature of said heat transfer fluid within said reservoir at a selected temperature;

means for recirculating said heat transfer fluid through said plates in fluid-connection with said reservoir, said top cover plate, and said base plate, and at least one food article sealed within at least one heat conducting container disposed between said top cover plate and said base plate.

2. The clamshell cook and staging grill of claim 1, including at least one intermediate plate spaced apart from, inbetween, and in alignment with said top cover plate and said base plate.

3. The clamshell cook and staging grill of claim 1, including means of sealing disposed inbetween said plates.

4. The clamshell cook and staging grill of claim 1, wherein the temperature of said heat transfer fluid is less than 212° F.

5. The clamshell cook and staging grill of claim 1, wherein said plate is comprised of roll bonded aluminum.

6. The clamshell cook and staging grill of claim 5, wherein said roll bonded plate is formed of sheets of aluminum having a thickness of from about 0.020 to about 0.060 inches in thickness.

7. The clamshell cook and staging grill of claim 1, wherein said plate is pillowed forming depressions therein for containing food articles.

8. The clamshell cook and staging grill of claim 1, wherein said plate is deep-drawn forming vessels therein for containing food articles having a depth of between about ¼ inch and about 14 inches.

9. The clamshell cook and staging grill of claim 1, wherein said first plate and said second plate have opposing depressions formed therein conforming to a half-diameter of a food article, said opposing depressions surrounding said food article for high-speed thermalization.

10. The clamshell cook and staging grill of claim 1, including means for biasing said plates in an open "up" position for filling or emptying said plate.

11. The clamshell cook and staging grill of claim 1, including means for latching said plates together.

12. The clamshell cook and staging grill of claim 11, whereby said means for latching is responsive to a control and alarm system controlled with a process controller and digital monitor.

13. The clamshell cook and staging grill of claim 11, wherein said means for latching comprises magnetic locking latches.

14. The clamshell cook and staging grill of claim 1, whereby said plates are positionable from a horizontal conductive thermalizing position to a vertically angled, conductive thermalizing position between from the horizontal plane at an angle of from about 0 degrees to about 65 degrees.

15. The clamshell cook and staging grill of claim 1, wherein said means for recirculating said heat transfer fluid through said plates in fluid-connection with said reservoir and each of said heat transfer plates is a low-pressure magnetic centrifugal pump.

16. The clamshell cook and staging grill of claim 1, wherein said means for heating said heat transfer fluid to a selected temperature in said reservoir comprises at least one electric heating element submerged in said reservoir in electrical communication with a controller.

17. The clamshell cook and staging grill of claim 1, wherein said means for controlling the temperature of said heat transfer fluid within said reservoir at a selected temperature of about ±2° F. is an electronic proportionate thermocouple-sensitive means in thermal communication with said heat transfer fluid and said controller for alternately activating and deactivating said means for heating at frequencies required to effect the maintenance of specific temperatures within the narrow range of ±2° F.

18. The clamshell cook and staging grill of claim 1, including a computerized electronic control system to direct and monitor the process and record the time and temperature variables as well as internal product temperature equilibration.

19. The clamshell cook and staging grill of claim 1, wherein said means for connectively mounting said plates in hinged alignment with one another and to said housing comprises at least one floating lever hinge attached to said plates.

20. The clamshell cook and staging grill of claim 1, including means for spacing said plates apart from one another a selected distance.

* * * * *